United States Patent …  
Li et al.

(10) Patent No.: US 12,132,519 B2
(45) Date of Patent: Oct. 29, 2024

(54) OPTICAL MODULE

(71) Applicant: HISENSE BROADBAND MULTIMEDIA TECHNOLOGIES CO., LTD., Qingdao (CN)

(72) Inventors: Dan Li, Qingdao (CN); Yifan Xie, Qingdao (CN); Mengbo Fu, Qingdao (CN); Qinhao Fu, Qingdao (CN); Tengfei Wang, Qingdao (CN); Feng Cui, Qingdao (CN); Chuanbin Li, Qingdao (CN); Zhanpeng Zhang, Qingdao (CN)

(73) Assignee: HISENSE BROADBAND MULTIMEDIA TECHNOLOGIES CO., LTD., Qingdao (CN)

( * ) Notice: Subject to any disclaimer, the term of this patent is extended or adjusted under 35 U.S.C. 154(b) by 0 days.

(21) Appl. No.: 18/087,003

(22) Filed: Dec. 22, 2022

(65) Prior Publication Data

US 2023/0127729 A1    Apr. 27, 2023

Related U.S. Application Data

(63) Continuation of application No. PCT/CN2021/135639, filed on Dec. 6, 2021.

(30) Foreign Application Priority Data

Mar. 4, 2021 (CN) .......................... 202110239420.5
Mar. 4, 2021 (CN) .......................... 202110240099.2
(Continued)

(51) Int. Cl.
H04B 10/00       (2013.01)
H04B 10/25       (2013.01)
(Continued)

(52) U.S. Cl.
CPC .............. H04B 10/25 (2013.01); H04J 14/02 (2013.01)

(58) Field of Classification Search
CPC .......... H04B 10/40; H04B 10/43; G02B 6/42; G02B 6/4246; G02B 6/4257
See application file for complete search history.

(56) References Cited

U.S. PATENT DOCUMENTS

2016/0004020 A1    1/2016    Shao et al.
2017/0272169 A1    9/2017    Ho et al.
(Continued)

FOREIGN PATENT DOCUMENTS

CN    105589141 A    5/2016
CN    105988168 A    10/2016
(Continued)

OTHER PUBLICATIONS

International Search Report and Written Opinion dated Jan. 26, 2022 in corresponding International Application No. PCT/CN2021/135639, translated, 18 pages.
(Continued)

Primary Examiner — Daniel G Dobson
(74) Attorney, Agent, or Firm — MH2 TECHNOLOGY LAW GROUP LLP

(57) ABSTRACT

An optical module includes a base, a first cover, a circuit board, a light emitting assembly and a light receiving assembly. The light emitting assembly includes a plurality of light-emitting chips and an optical multiplexer. The plurality of light-emitting chips are disposed on the first bottom plate. The optical multiplexer is disposed on the first cover and is located in a laser exit direction of the plurality of light-emitting chips. The light receiving assembly includes an optical demultiplexer and a plurality of light-receiving chips. The optical demultiplexer is disposed on the first
(Continued)

cover. The plurality of light-receiving chips are disposed on the circuit board and are located in a laser exit direction of the optical demultiplexer.

20 Claims, 13 Drawing Sheets

(30) Foreign Application Priority Data

| Mar. 4, 2021 | (CN) | 202110242132.5 |
|---|---|---|
| Mar. 4, 2021 | (CN) | 202110242136.3 |
| Mar. 4, 2021 | (CN) | 202120468688.1 |
| Mar. 4, 2021 | (CN) | 202120473645.2 |
| Mar. 9, 2021 | (CN) | 202110255209.2 |
| Mar. 9, 2021 | (CN) | 202110257226.X |
| Mar. 9, 2021 | (CN) | 202120501408.2 |
| Mar. 9, 2021 | (CN) | 202120504482.X |

(51) Int. Cl.
*H04J 14/02* (2006.01)
*H04J 14/00* (2006.01)

(56) References Cited

U.S. PATENT DOCUMENTS

| 2018/0254831 | A1 | 9/2018 | Ishii et al. | |
| 2018/0348456 | A1* | 12/2018 | Ho | G02B 6/4215 |
| 2020/0328815 | A1 | 10/2020 | Li et al. | |
| 2021/0157058 | A1* | 5/2021 | Lin | G02B 6/4246 |

FOREIGN PATENT DOCUMENTS

| CN | 108761668 A | 11/2018 |
| CN | 108919435 A | 11/2018 |
| CN | 109283632 A | 1/2019 |
| CN | 110376691 A | 10/2019 |
| CN | 110596833 A | 12/2019 |
| CN | 110618505 A | 12/2019 |
| CN | 209879078 U | 12/2019 |
| CN | 110954999 A | 4/2020 |
| CN | 111338039 A | 6/2020 |
| CN | 210835351 U | 6/2020 |
| CN | 111458815 A | 7/2020 |
| CN | 211348752 U | 8/2020 |
| CN | 212083738 U | 12/2020 |
| CN | 212083739 U | 12/2020 |
| CN | 212160161 U | 12/2020 |
| CN | 112838897 A | 5/2021 |
| CN | 112929092 A | 6/2021 |
| CN | 214174689 U | 9/2021 |
| CN | 214228255 U | 9/2021 |
| CN | 214228256 U | 9/2021 |
| CN | 115016074 A | 9/2022 |
| EP | 3940438 A1 | 1/2022 |
| WO | 2019173998 A1 | 9/2019 |
| WO | 2020029739 A1 | 2/2020 |
| WO | 2020186862 A1 | 9/2020 |

OTHER PUBLICATIONS

First Chinese Office Action dated Jan. 19, 2023 in corresponding Chinese Application No. 202110239420.5, translated, 13 pages.
First Chinese Office Action dated Dec. 23, 2022 in corresponding Chinese Application No. 202110240099.2 translated, 13 pages.
Second Chinese Office Action dated Jun. 10, 2023 in corresponding Chinese Application No. 202110240099.2 translated, 14 pages.
First Chinese Office Action dated Dec. 23, 2022 in corresponding Chinese Application No. 202110242132.5, translated, 12 pages.
First Chinese Office Action dated Jan. 20, 2023 in corresponding Chinese Application No. 202110242136.3, translated, 13 pages.

\* cited by examiner

OPTICAL MODULE

CROSS-REFERENCE TO RELATED APPLICATIONS

This application is a Continuation Application of International Application No. PCT/CN2021/135639, filed on Dec. 6, 2021, pending, which claims priority to Chinese Patent Application No. 202110257226. X, filed on Mar. 9, 2021, Chinese Patent Application No. 202120504482. X, filed on Mar. 9, 2021, Chinese Patent Application No. 202110239420.5, filed on Mar. 4, 2021, Chinese Patent Application No. 202110240099.2, filed on Mar. 4, 2021, Chinese Patent Application No. 202110242132.5, filed on Mar. 4, 2021, Chinese Patent Application No. 202110242136.3, filed on Mar. 4, 2021, Chinese Patent Application No. 202110255209.2, filed on Mar. 9, 2021, Chinese Patent Application No. 202120468688.1, filed on Mar. 4, 2021, Chinese Patent Application No. 202120473645.2, filed on Mar. 4, 2021, and Chinese Patent Application No, 202120501408.2, filed on Mar. 9, 2021, which are incorporated herein by reference in their entireties.

TECHNICAL FIELD

The present disclosure relates to the field of optical communication technologies, and in particular, to an optical module.

BACKGROUND

With development of new services and application modes such as cloud computing, mobile Internet and video conferencing, development and progress of optical communication technologies are increasingly important. In the optical communication technologies, an optical module is a tool for achieving interconversion between an optical signal and an electrical signal, and is a key component in an optical communication device. In addition, with the demand for development of the optical communication technologies, a transmission rate of the optical module is continuously increasing.

SUMMARY

An optical module is provided. The optical module includes a base, a first cover, a circuit board, a light emitting assembly, and a light receiving assembly. The base includes a first bottom plate provided with a first step surface, a second step surface, and a first connecting surface connected to the first step surface and the second step surface, and the first step surface is higher than the second step surface. The first cover covers the base. The circuit board includes a first portion and a second portion. The first portion is inserted into the base and is located on the first step surface. A surface of the second portion proximate to the first portion abuts against the first connecting surface, and a width of the first portion is less than a width of the second portion. The light emitting assembly includes a plurality of light-emitting chips and an optical multiplexer. The plurality of light-emitting chips are disposed on the first bottom plate. The optical multiplexer is disposed on the first cover and is located in a laser exit direction of the plurality of light-emitting chips. The light receiving assembly includes an optical demultiplexer and a plurality of light-receiving chips. The optical demultiplexer is disposed on the first cover. The plurality of light-receiving chips are disposed on the circuit board and are located in a laser exit direction of the optical demultiplexer.

BRIEF DESCRIPTION OF THE DRAWINGS

In order to describe technical solutions in the present disclosure more clearly, accompanying drawings to be used in some embodiments of the present disclosure will be introduced briefly. However, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, actual processes of methods and actual timings of signals that the embodiments of the present disclosure relate to.

DETAILED DESCRIPTION

Figure 1:
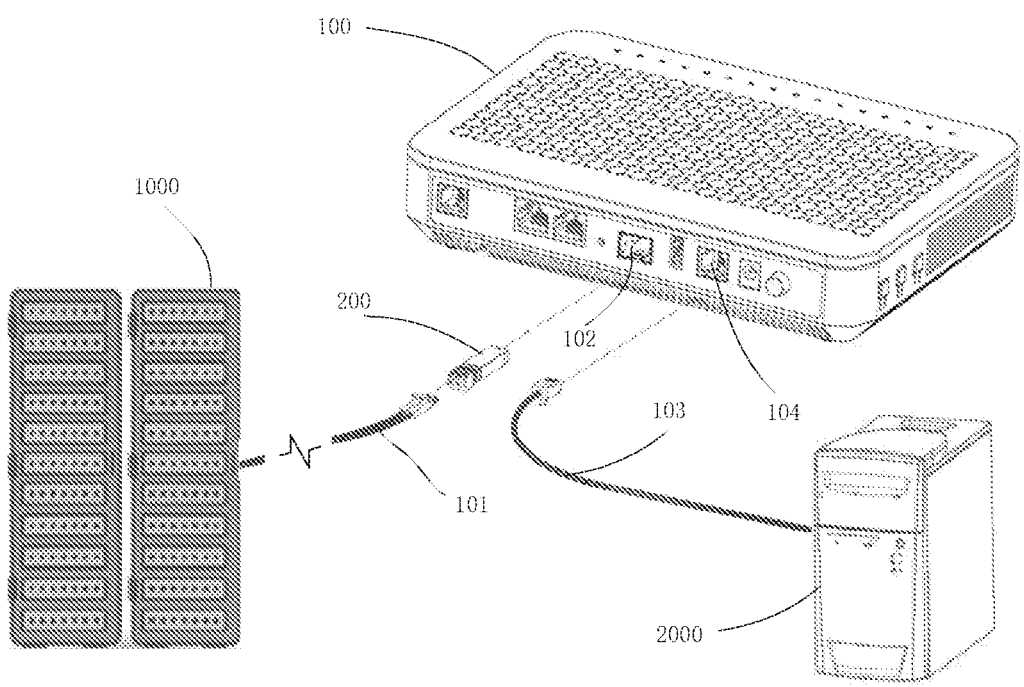
FIG. 1 is a diagram showing a connection relationship of an optical communication system, in accordance with some embodiments.

Some embodiments of the present disclosure will be described clearly and completely with reference to the accompanying drawings below. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined by "first" or "second" may explicitly or implicitly include one or more of the features.

In the description of the embodiments of the present disclosure, unless otherwise specified, the term "a/the plurality of" means two or more.

In the description of some embodiments, the terms "coupled" and "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact with each other. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B, and C" has the same meaning as the phrase "at least one of A, B, or C," and both include the following combinations of A, B, and C only A, only B, only C, a combination of A and B, a combination of A and C, a combination of B and C, and a combination of A, B, and C.

The phrase "A and/or B" includes following three combinations: only A, only B, and a combination of A and B.

The use of the phrase "applicable to" or "configured to" herein means an open and inclusive language, which does not exclude devices that are applicable to or configured to perform additional tasks or steps.

The term "about," "substantially," and "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

In an optical communication system, an optical signal is used to carry information to be transmitted, and the optical signal carrying the information is transmitted to an information processing device such as a computer through an information transmission device such as an optical fiber or an optical waveguide, so as to achieve transmission of the information. Since the optical signal has a characteristic of passive transmission when being transmitted through the optical fiber or the optical waveguide, low-cost and low-loss information transmission may be achieved. In addition, since a signal transmitted by the information transmission device such as the optical fiber or the optical waveguide is an optical signal, and a signal that can be recognized and processed by the information processing device such as the computer is an electrical signal, in order to establish information connection between the information transmission device such as the optical fiber or the optical waveguide and the information processing device such as the computer, interconversion between the electrical signal and the optical signal needs to be achieved.

In the field of optical fiber communication technology, an optical module may achieve the interconversion between the optical signal and the electrical signal. The optical module includes an optical port and an electrical port. The optical module achieves optical communication with the information transmission device such as the optical fiber or the optical waveguide through the optical port, and the optical module achieves electrical connection with an optical network terminal (e.g., an optical modem) through the electrical port. The electrical connection is mainly used for implementing power supply, transmission of an I2C signal, transmission of data information, and grounding. The optical network terminal transmits the electrical signal to the information processing device such as the computer through a network cable or wireless fidelity (Wi-Fi).

FIG. 1 is a diagram showing a connection relationship of an optical communication system in accordance with some embodiments. As shown in FIG. 1, the optical communication system includes a remote server 1000, a local information processing device 2000, an optical network terminal 100, an optical module 200, an optical fiber 101, and a network cable 103.

An end of the optical fiber 101 is connected to the remote server 1000, and another end thereof is connected to the optical network terminal 100 through the optical module 200. The optical fiber itself supports long-distance signal transmission, such as several-kilometer (e.g., 6-kilometer to 8-kilometer) signal transmission. Based on this, if repeaters are used, theoretically, it may be possible to achieve infinite-distance transmission. Therefore, in a typical optical communication system, a distance between the remote server 1000 and the optical network terminal 100 may typically reach several kilometers, dozens of kilometers, or hundreds of kilometers.

An end of the network cable 103 is connected to the local information processing device 2000, and another end thereof is connected to the optical network terminal 100. The local information processing device 2000 includes one or more of a router, a switch, a computer, a mobile phone, a tablet computer, or a television.

A physical distance between the remote server 1000 and the optical network terminal 100 is greater than a physical distance between the local information processing device 2000 and the optical network terminal 100. A connection between the local information processing device 2000 and the remote server 1000 is achieved by the optical fiber 101 and the network cable 103, and a connection between the optical fiber 101 and the network cable 103 is achieved by the optical module 200 and the optical network terminal 100.

The optical module 200 includes an optical port and an electrical port. The optical port is configured to connect to the optical fiber 101, so that a bidirectional optical signal connection between the optical module 200 and the optical fiber 101 is established. The electrical port is configured to connect to the optical network terminal 100, so that a bidirectional electrical signal connection between the optical module 200 and the optical network terminal 100 is established. The optical module 200 may achieve interconversion between the optical signal and the electrical signal, so that information connection between the optical fiber 101 and the optical network terminal 100 is established. For example, an optical signal from the optical fiber 101 is converted into an electrical signal by the optical module 200, and then the electrical signal is input to the optical network terminal 100; and an electrical signal from the optical network terminal 100 is converted into an optical signal by the optical module 200, and then the optical signal is input to the optical fiber 101. Since the optical module 200 is a tool for achieving the interconversion between the optical signal and the electrical signal and doesn't have a data processing function, the information does not change in the above photoelectric conversion process.

The optical network terminal 100 includes a housing in a substantially cuboid shape, and an optical module interface 102 and a network cable interface 104 that are disposed on the housing. The optical module interface 102 is configured to connect to the optical module 200, so that a bidirectional electrical signal connection between the optical network terminal 100 and the optical module 200 is established. The network cable interface 104 is configured to connect to the network cable 103, so that a bidirectional electrical signal connection between the optical network terminal 100 and the network cable 103 is established. A connection between the optical module 200 and the network cable 103 is established through the optical network terminal 100. For example, the optical network terminal 100 transmits an electrical signal from the optical module 200 to the network cable 103 and transmits an electrical signal from the network cable 103 to the optical module 200. Therefore, the optical network terminal 100, as a master monitor of the optical module 200, may monitor operation of the optical module 200. In addition to the optical network terminal 100, the master monitor of the optical module 200 may further include an optical line terminal (OLT).

A bidirectional signal transmission channel is established between the remote server 1000 and the local information processing device 2000 through the optical fiber 101, the optical module 200, the optical network terminal 100, and the network cable 103.

Figure 2:
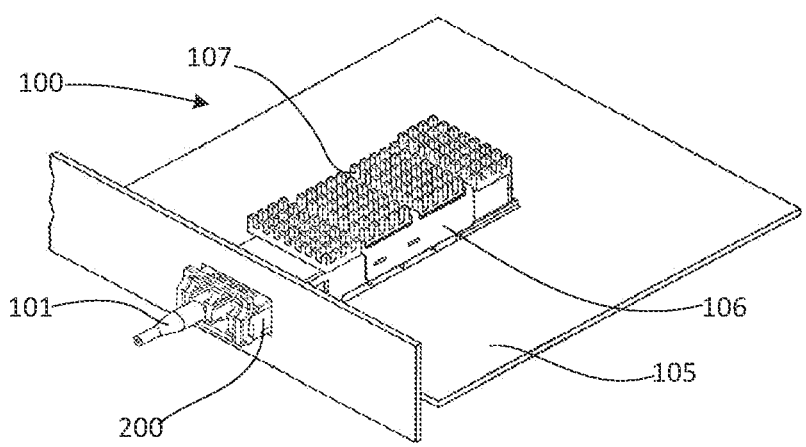
FIG. 2 is a structural diagram of an optical network terminal, in accordance with some embodiments.

FIG. 2 is a structural diagram of an optical network terminal in accordance with some embodiments. In order to clearly show a connection relationship between the optical module 200 and the optical network terminal 100, FIG. 2 only shows a structure of the optical network terminal 100 related to the optical module 200. As shown in FIG. 2, the optical network terminal 100 further includes a circuit board 105 disposed in the housing, a cage 106 disposed on a surface of the circuit board 105, a heat sink 107 disposed on the cage 106, and an electrical connector disposed inside the cage 106. The electrical connector is configured to connect to the electrical port of the optical module 200. The heat sink 107 has protruding portions such as fins for increasing a heat dissipation area.

The optical module 200 is inserted into the cage 106 of the optical network terminal 100 and is fixed by the cage 106, and heat generated by the optical module 200 is conducted to the cage 106 and is then dissipated through the heat sink 107. After the optical module 200 is inserted into the cage 106, the electrical port of the optical module 200 is connected to the electrical connector inside the cage 106, so that a bidirectional electrical signal connection between the optical module 200 and the optical network terminal 100 is established. In addition, the optical port of the optical module 200 is connected to the optical fiber 101, so that a bidirectional optical signal connection between the optical module 200 and the optical fiber 101 is established.

Figure 3:
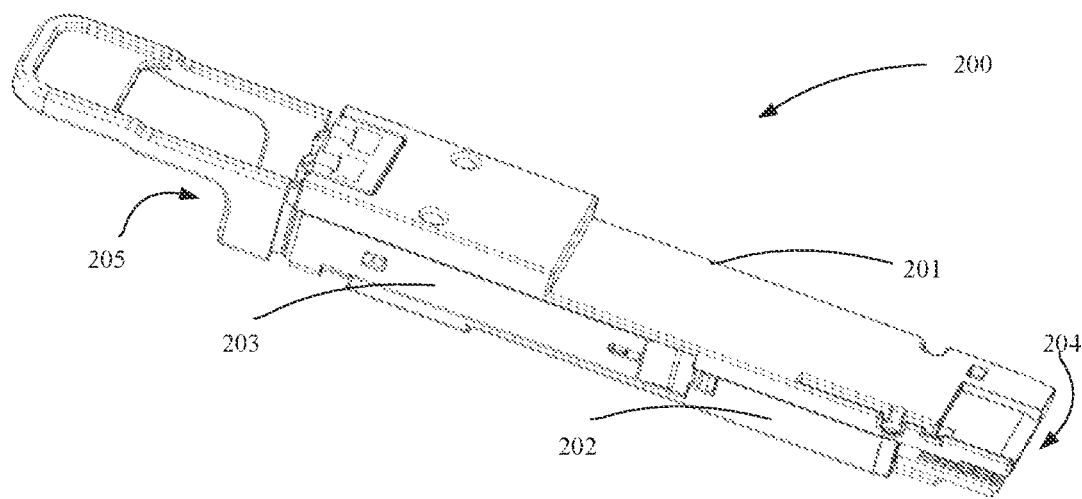
FIG. 3 is a structural diagram of an optical module, in accordance with some embodiments.
Figure 4:
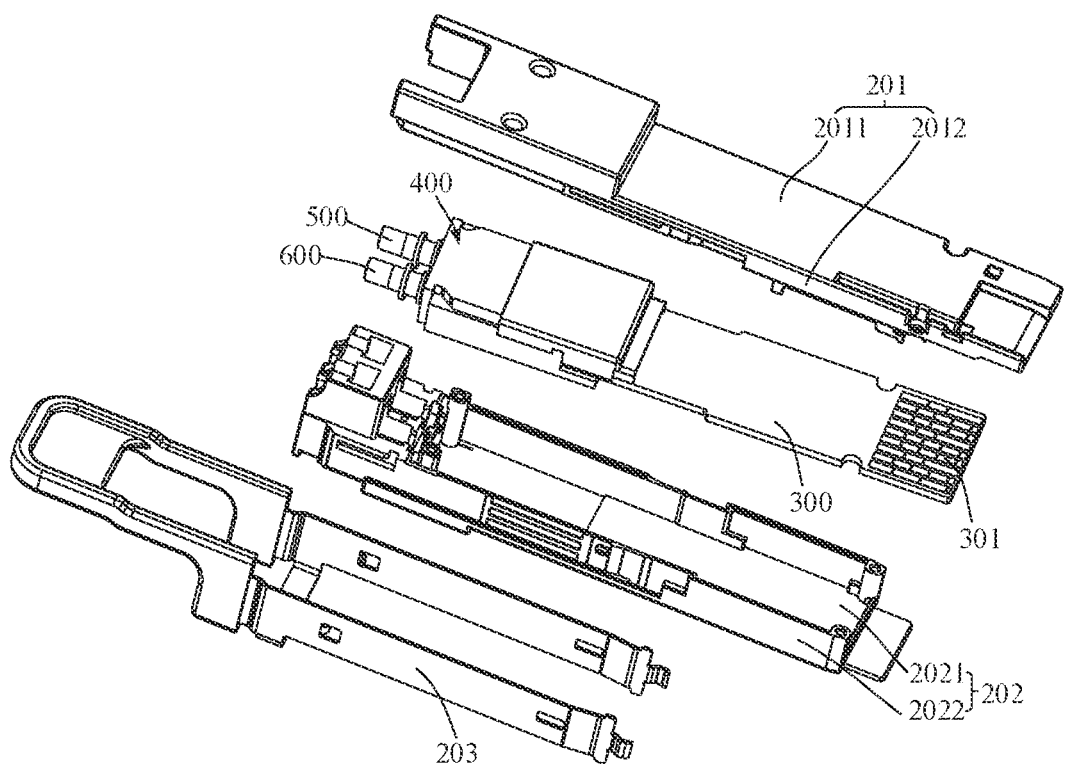
FIG. 4 is an exploded view of an optical module, in accordance with some embodiments.

FIG. 3 is a structural diagram of an optical module in accordance with some embodiments, and FIG. 4 is an exploded view of an optical module in accordance with some embodiments. As shown in FIGS. 3 and 4, the optical module 200 provided by some embodiments of the present disclosure includes a shell, and a circuit board 300 and an optical transceiving assembly 400 that are disposed in the shell.

The shell includes an upper shell 201 and a lower shell 202. The upper shell 201 covers the lower shell 202 to form the shell with two openings 204 and 205, and an outer contour of the shell is generally in a cuboid shape.

In some embodiments of the present disclosure, the lower shell 202 includes a bottom plate 2021 and two lower side plates 2022 that are located on two sides of the bottom plate 2021 and disposed perpendicular to the bottom plate 2021. The upper shell 201 includes a cover plate 2011, and the cover plate 2011 covers the two lower side plates 2022 of the lower shell 202 to form the shell.

In some embodiments of the present disclosure, the lower shell 202 includes the bottom plate 2021 and the two lower side plates 2022 that are located on two sides of the bottom plate 2021 and disposed perpendicular to the bottom plate 2021, and the upper shell 201 includes the cover plate 2011 and two upper side plates 2012 that are located on two sides of the cover plate 2011 and disposed perpendicular to the cover plate 2011. The two upper side plates 2012 are combined with the two lower side plates 2022, so that the upper shell 201 covers the lower shell 202.

A direction in which a connection line between the two openings 204 and 205 extends may be or may not be the same as a length direction of the optical module 200. For example, the opening 204 is at an end (a right end in FIG. 3) of the optical module 200, and the opening 205 is also at an end (a left end in FIG. 3) of the optical module 200. Alternatively, the opening 204 is at an end of the optical module 200, while the opening 205 is at a side of the optical module 200. The opening 204 is the electrical port, and a connecting finger 301 of the circuit board 300 extends out from the electrical port 204, and is inserted into the master monitor (e.g., the optical network terminal 100). The opening 205 is the optical port, and is configured to connect to an external optical fiber 101, so that the external optical fiber 101 is connected to the optical transceiving assembly 400 in the optical module 200.

With an assembly manner of combining the upper shell 201 with the lower shell 202, it may be easier to install the circuit board 300 and the optical transceiving assembly 400 into the shell, and the upper shell 201 and the lower shell 202 may provide sealing and protection for these devices. In addition, during the assembly of the devices such as the circuit board 300, it may be easier to arrange positioning components, heat dissipation components, and electromagnetic shielding components of these devices, which facilitates the implementation of automated production.

In some embodiments, the upper shell 201 and the lower shell 202 are generally made of a metallic material, which helps achieve electromagnetic shielding and heat dissipation.

In some embodiments, the optical module 200 further includes an unlocking component 203 located on an outer wall of the shell, and the unlocking component 203 is configured to implement or release a fixed connection between the optical module 200 and the master monitor.

For example, the unlocking component 203 is located on outer walls of the two lower side plates 2022 of the lower shell 202 and includes an engagement component that is matched with the cage of the master monitor (e.g., the cage 106 of the optical network terminal 100). When the optical module 200 is inserted into the cage of the master monitor, the optical module 200 is fixed in the cage of the master monitor by the engagement component of the unlocking component 203. When the unlocking component 203 is pulled, the engagement component of the unlocking component 203 moves along with the unlocking component, and then a connection relationship between the engagement component and the master monitor is changed to release the engagement between the optical module 200 and the master monitor, so that the optical module 200 is pulled out of the cage of the master monitor.

The circuit board 300 includes circuit traces, electronic elements, and chips. Through the circuit traces, the electronic elements and the chips are connected together according to circuit design, so as to achieve functions such as power supply, electrical signal transmission, and grounding. The electronic elements may include, for example, a capacitor, a resistor, a triode, and a metal-oxide-semiconductor field-effect transistor (MOSFET). The chips may include, for example, a microcontroller unit (MCU), a limiting amplifier, a clock and data recovery (CDR) chip, a power management chip, or a digital signal processing (DSP) chip.

The circuit board 300 is generally a rigid circuit board, and the rigid circuit board may also have a support function due to its relatively hard material. For example, the rigid circuit board may stably support the electronic elements and the chips. The rigid circuit board may also be inserted into the electrical connector in the cage of the master monitor.

The circuit board 300 further includes a connecting finger 301 formed on an end surface thereof, and the connecting finger 301 is composed of a plurality of independent pins. The circuit board 300 is inserted into the cage 106, and is conductively connected to the electrical connector inside the cage 106 through the connecting finger 301. The connecting finger 301 may be disposed on only one surface (e.g., an upper surface shown in FIG. 4) of the circuit board 300, or may be disposed on both upper and lower surfaces of the circuit board 300 to adapt to an occasion where a large number of pins are needed. The connecting finger 301 is configured to establish an electrical connection with the master monitor to implement power supply, grounding, transmission of I2C signals, transmission of data signals, etc. Of course, flexible circuit boards are also used in some optical modules. A flexible circuit board is generally used in conjunction with a rigid circuit board to serve as a supplement for the rigid circuit board.

Figure 5:
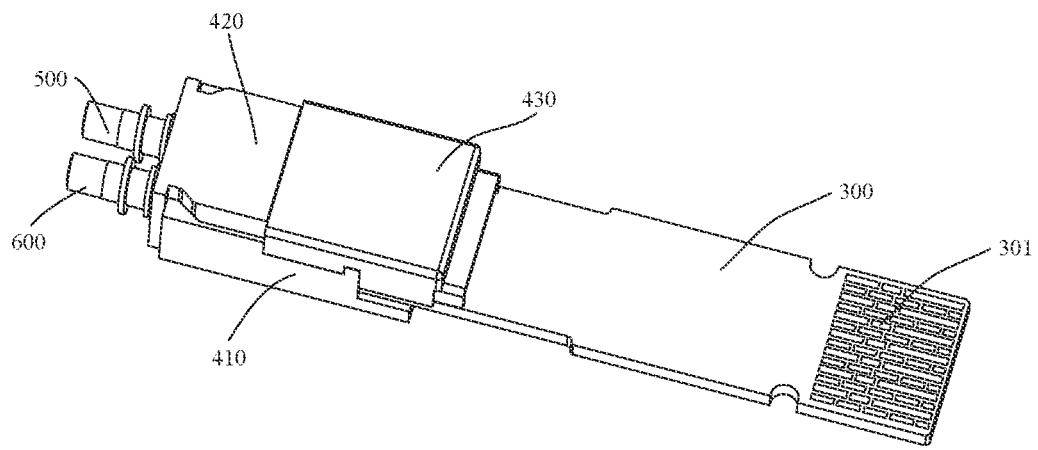
FIG. 5 is an assembly diagram of an optical transceiving assembly and a circuit board in an optical module, in accordance with some embodiments.
Figure 6:
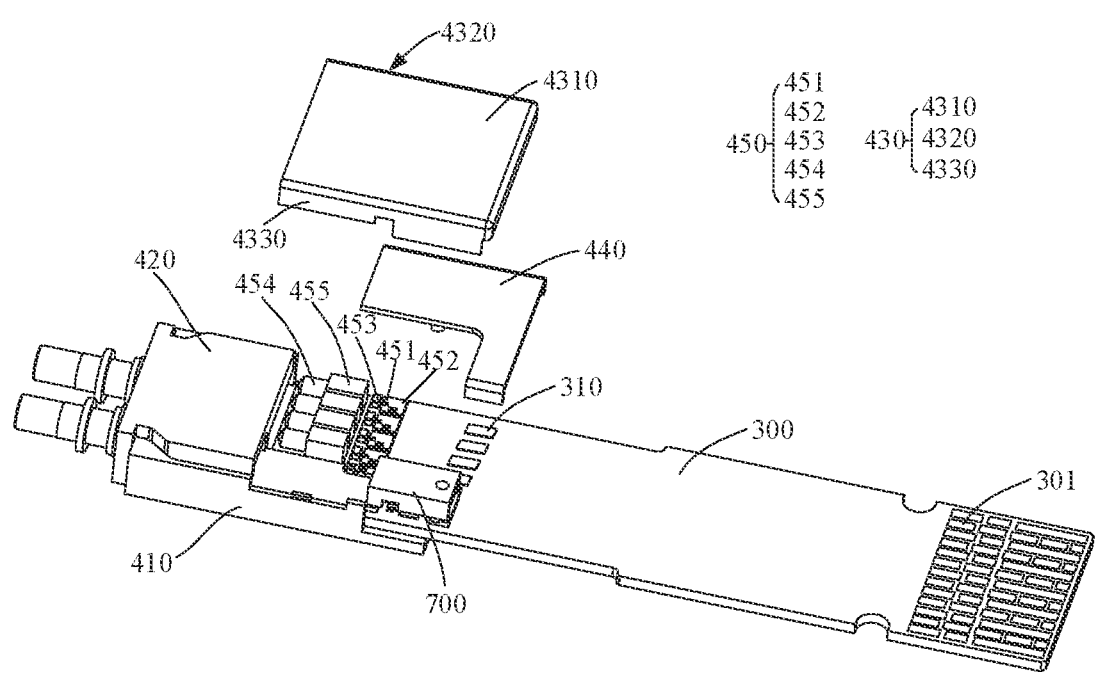
FIG. 6 is a partial exploded view of an optical transceiving assembly and a circuit board in an optical module, in accordance with some embodiments.
Figure 7:
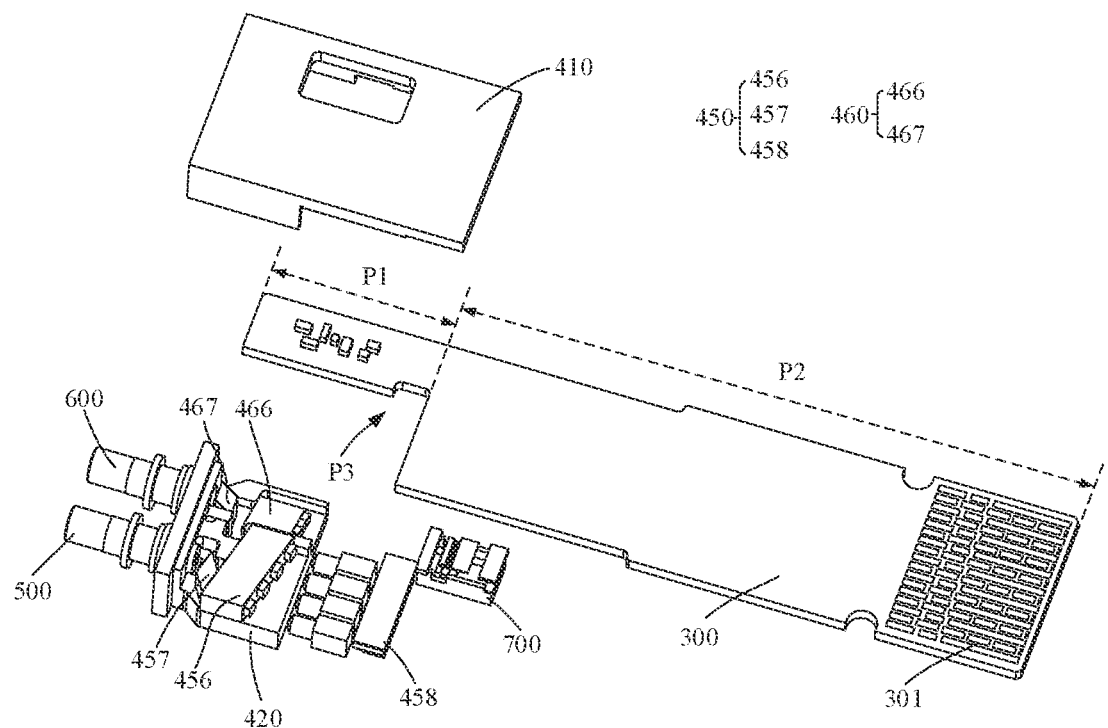
FIG. 7 is a partial exploded view of FIG. 6 with the viewing angle upside down.

FIG. 5 is an assembly diagram of an optical transceiving assembly and a circuit board in an optical module in accordance with some embodiments, FIG. 6 is a partial exploded view of an optical transceiving assembly and a circuit board in an optical module in accordance with some embodiments, and FIG. 7 is a partial exploded view of FIG. 6 with the viewing angle upside down. As shown in FIGS. 5 to 7, the optical transceiving assembly 400 is at an end of the circuit board 300 away from the connecting finger 301. The optical transceiving assembly 400 includes an optical transceiving case, a light emitting assembly 450 and a light receiving assembly 460. The optical transceiving case includes a base 410, a first cover 420, and a second cover 430. The first cover 420 and the second cover 430 cover the base 410 to form the optical transceiving case with an accommodating cavity, and the light emitting assembly 450 and the light receiving assembly 460 are both disposed in the accommodating cavity. The optical transceiving case further includes an opening provided at an end thereof, and the circuit board 300 is inserted into the accommodating cavity through the opening, which facilitates electrical connections between the light emitting assembly 450 and the circuit board 300, and between the light receiving assembly 460 and the circuit board 300.

In some embodiments of the present disclosure, the optical module 200 further includes a first fiber optic adapter 500 and a second fiber optic adapter 600. The first fiber optic adapter 500 and the second fiber optic adapter 600 are disposed on a surface of the optical transceiving case away from the connecting finger 301 and are inserted into the accommodating cavity of the optical transceiving case. The first fiber optic adapter 500 is optically connected to the light emitting assembly 450, and is configured to transmit an optical signal emitted by the light emitting assembly 450 to an outside of the optical module 200, thereby realizing emission of a laser beam. The second fiber optic adapter 600 is optically connected to the light receiving assembly 460, and is configured to transmit an optical signal from the outside of the optical module 200 to the light receiving assembly 460, thereby realizing receiving of a laser beam.

The first fiber optic adapter 500 and the second fiber optic adapter 600 are further connected to a fiber optic connector outside the optical module 200, thereby being connected to the optical fiber 101 outside the optical module 200 through the fiber optic connector. The first fiber optic adapter 500 transmits the optical signal emitted by the light emitting assembly 450 to the external optical fiber 101, thereby realizing emission of the laser beam. The second fiber optic adapter 600 transmits the optical signal from the external optical fiber 101 to the light receiving assembly 460, thereby realizing receiving of the laser beam.

The first fiber optic adapter 500 and the second fiber optic adapter 600 are arranged side by side in a width direction of the circuit board 300, and the first fiber optic adapter 500 and the second fiber optic adapter 600 are located at a same height in a thickness direction of the circuit board 300. The fiber optic connector outside the optical module 200 is a standard component commonly used in the industry, and a shape and size of the fiber optic connector limit positions of two fiber optic adapters inside the optical module 200. Thus, the first fiber optic adapter 500 is disposed at a same height as the second fiber optic adapter 600.

In some embodiments of the present disclosure, the arrangement of optical devices of the light emitting assembly 450 need to ensure a high precision of optical paths. Since a surface precision of the circuit board 300 is low, and if the optical devices of the light emitting assembly 450 are disposed on the circuit board 300, a low precision of alignment of the optical paths between the optical devices of the light emitting assembly 450 may be caused. To avoid this, some of the optical devices of the light emitting assembly 450 are supported by a metal plate and are disposed separately from the circuit board 300.

Figure 8:
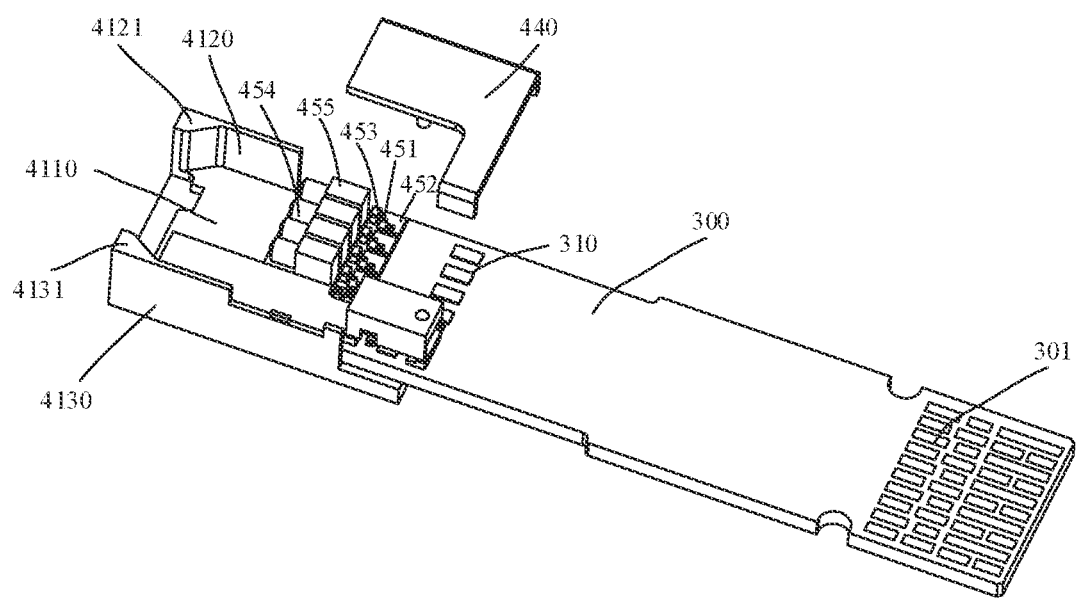
FIG. 8 is an assembly diagram of a base, a light emitting assembly and a circuit board in an optical module, in accordance with some embodiments.
Figure 9:
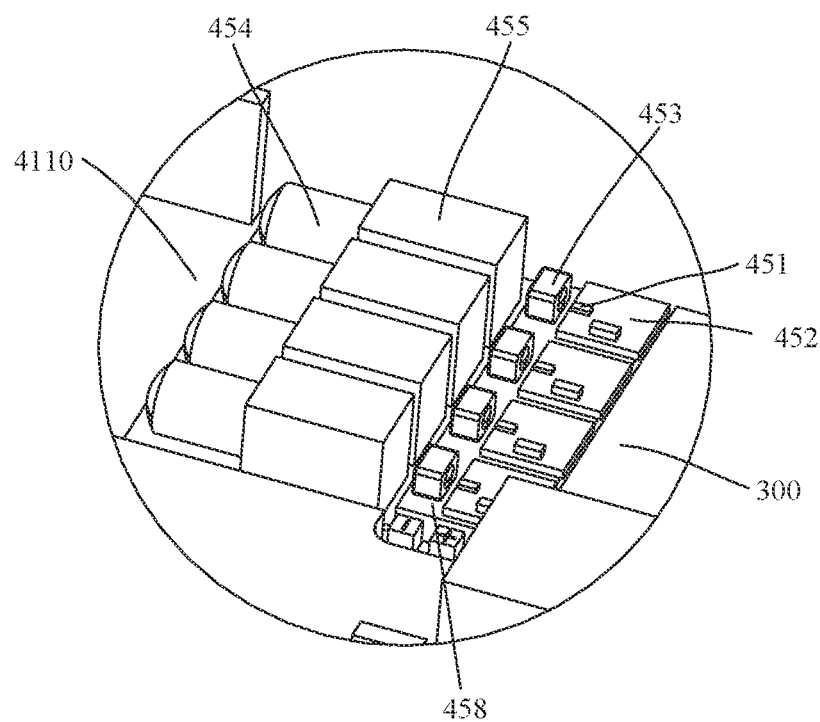
FIG. 9 is a partial assembly diagram of a base and a light emitting assembly in an optical module, in accordance with some embodiments.
Figure 10:
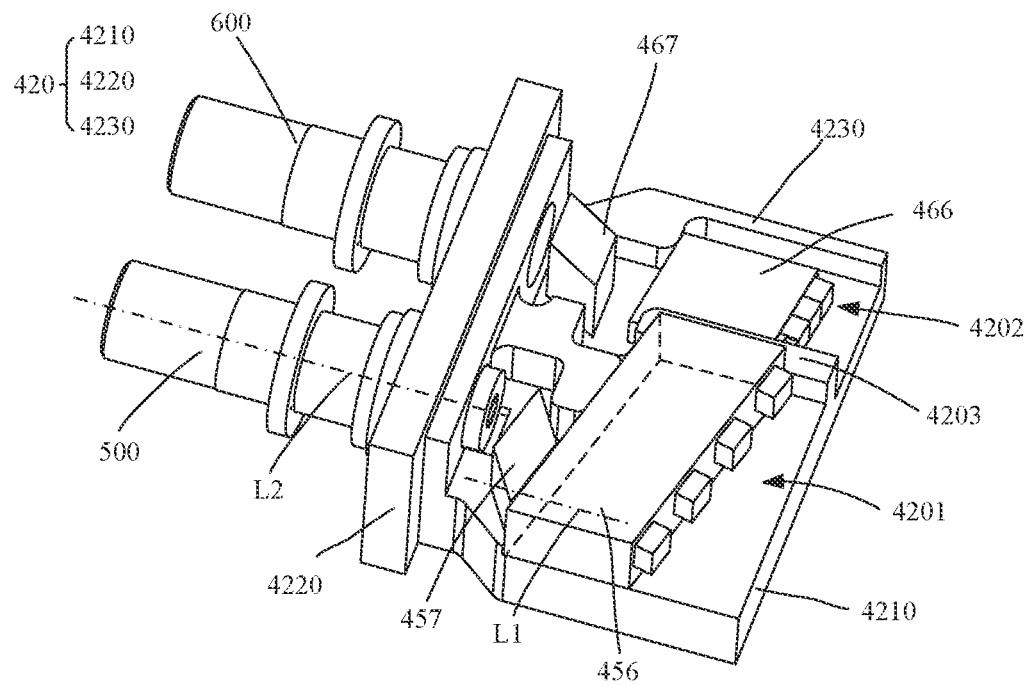
FIG. 10 is a partial structural diagram of an optical transceiving assembly in an optical module, in accordance with some embodiments.

FIG. 8 is an assembly diagram of a base, a light emitting assembly, and a circuit board in an optical module in accordance with some embodiments, FIG. 9 is a partial assembly diagram of a base and a light emitting assembly in an optical module in accordance with some embodiments, and FIG. 10 is a partial structural diagram of an optical transceiving assembly in an optical module in accordance with some embodiments. As shown in FIGS. 8 and 9, the light emitting assembly 450 further includes a plurality of light-emitting chips 451. Each light-emitting chip 451 is disposed on an inner wall of the base 410 and is configured to emit a beam with one wavelength. The plurality of light-emitting chips 451 are arranged in a line in the width direction of the circuit board 300 and emit a plurality of beams with different wavelengths. For example, as shown in FIG. 9, the light emitting assembly 450 includes four light-emitting chips 451. In some embodiments, the light-emitting chip 451 may be an electro-absorption modulated laser (EML), a direct modulated laser (DML), or a vertical cavity surface emitting laser (VCSEL).

In some embodiments, as shown in FIG. 10, the light emitting assembly 450 further includes an optical multiplexer 456. The optical multiplexer 456 is disposed on an inner wall of the first cover 420 and is located in a laser exit direction of the plurality of light-emitting chips 451, and the optical multiplexer 456 is configured to multiplex the plurality of beams with different wavelengths emitted by the plurality of light-emitting chips 451 into a composite beam. A surface (i.e., a laser incident surface) of the optical multiplexer 456 proximate to the light-emitting chips 451 has a plurality of beam inlets corresponding to the plurality of light-emitting chips 451, and a surface (i.e., a laser exit surface) of the optical multiplexer 456 away from the light-emitting chips 451 has a beam outlet. The plurality of beams with different wavelengths are incident into the optical multiplexer 456 through the plurality of beam inlets and are multiplexed into a composite beam by the optical multiplexer 456, and then the composite beam is emitted through the beam outlet. For example, the optical multiplexer 456 has four beam inlets corresponding to the four light-emitting chips 451.

In some embodiments, since a central axis L1 of the beam outlet of the optical multiplexer 456 is not aligned with a central axis L2 of a laser incident surface of the first fiber optic adapter 500, and there is a certain distance between the central axis L1 and the central axis L2 in the width direction of the circuit board 300, the light emitting assembly 450 further includes a first shift prism 457 to make the beam output by the optical multiplexer 456 incident on the first fiber optic adapter 500. The first shift prism 457 is disposed on the inner wall of the first cover 420 and is located in a laser exit direction of the optical multiplexer 456. The first shift prism 457 is configured to refract and reflect the composite beam output by the optical multiplexer 456, so as to adjust a propagation direction of the composite beam, such that the composite beam is coupled into the first fiber optic adapter 500, and emission of the laser beam is achieved.

In some embodiments, as shown in FIGS. 8 and 9, the light emitting assembly 450 further includes a plurality of substrates 452 corresponding to the plurality of light-emitting chips 451. The plurality of substrates 452 are disposed on the inner wall of the base 410 and arranged in a line in the width direction of the circuit board 300. Each light-emitting chip 451 is disposed on a corresponding substrate 452. For example, as shown in FIG. 9, the light emitting assembly 450 includes four substrates 452 corresponding to the four light-emitting chips 451. In some embodiments, the substrate 452 is generally a plate made of aluminum nitride or silicon.

In some embodiments, the light emitting assembly 450 further includes a plurality of first converging lenses 453 and a plurality of first collimating lenses 454 corresponding to the plurality of light-emitting chips 451. Each first converging lens 453 is disposed on the inner wall of the base 410, and is located in a laser exit direction of a corresponding light-emitting chip 451. Each first converging lens 453 is configured to convert the beam emitted from the corresponding light-emitting chip 451 into a convergent beam, so that a divergence angle of a diverging beam emitted by the light-emitting chip 451 is reduced. Each first collimating lens 454 is disposed on the inner wall of the base 410, is located in a laser exit direction of a corresponding first converging lens 453, and is configured to convert the convergent beam exiting the corresponding first converging lens 453 into a collimated beam. For example, as shown in FIG. 9, the light emitting assembly 450 includes four first converging lenses 453 and four first collimating lenses 454 that correspond to the four light-emitting chips 451.

It will be understood that, the plurality of first converging lenses 453 may also be referred to as a first converging lens array, and the plurality of first collimating lenses 454 may also be referred to as a first collimating lens array. The first converging lenses 453, the first collimating lenses 454, the optical multiplexer 456, and the first shift prism 457 are sequentially disposed in the laser exit direction of the light-emitting chip 451.

In some embodiments, since an outer surface of the first collimating lens 454 is a curved surface, in order to fix the first collimating lens 454 on the inner wall of the base 410, the light emitting assembly 450 further includes a plurality of glass blocks 455 corresponding to the plurality of first collimating lenses 454. Each glass block 455 is glued to the inner wall of the base 410, and a surface (a laser incident surface) of each first collimating lens 454 proximate to the light-emitting chip 451 is glued to a surface (a laser exit surface) of a corresponding glass block 455 away from the light-emitting chip 451, so that the corresponding first collimating lens 454 is fixed to the inner wall of the base 410 through the glass block 455. For example, as shown in FIG. 9, the light emitting assembly 450 includes four glass blocks 455.

The glass block 455 is not only used to fix the first collimating lens 454, and after a laser beam generated by the light-emitting chip 451 is converged through the first converging lens 453 (in this case, a divergence angle of the laser beam is reduced), the laser beam is incident on the first collimating lens 454 through the glass block 455. The glass block 455 does not perform displacement conversion on a beam with a small divergence angle, and the beam will be directly transmitted by the glass block 455.

In some embodiments of the present disclosure, the plurality of light-emitting chips 451, the plurality of first converging lenses 453, and the plurality of first collimating lenses 454 are all disposed in a cavity of the base 410, and the optical multiplexer 456 and the first shift prism 457 are both disposed in a cavity of the first cover 420. When installation is performed according to a direction of an emission optical path, and the first cover 420 covers the base 410, the light-emitting chips 451, the first converging lenses 453, the first collimating lenses 454, the optical multiplexer 456, the first shift prism 457, and the first fiber optic adapter 500 are sequentially disposed in a laser emission direction. Beams with different wavelengths generated by the plurality of light-emitting chips 451, after being converged by the plurality of first converging lenses 453, are incident on the plurality of glass blocks 455, are transmitted to the plurality of first collimating lenses 454 through the plurality of glass blocks 455, are incident on the optical multiplexer 456 after being collimated by the plurality of first collimating lenses 454, and are multiplexed into a composite beam by the optical multiplexer 456. The composite beam, after being refracted and reflected by the first shift prism 457, is coupled to the first fiber optic adapter 500, and is transmitted to the outside of the optical module 200 through the first fiber optic adapter 500, thereby realizing emission of the laser beam.

In some embodiments, as shown in FIG. 9, the light emitting assembly 450 further includes a semiconductor cooler 458, and the semiconductor cooler 458 is disposed on the inner wall of the base 410. The plurality of substrates 452 and the plurality of first converging lenses 453 are disposed on a surface of the semiconductor cooler 458, and each light-emitting chip 451 is disposed on a surface of a corresponding substrate 452 away from the semiconductor cooler 458. In this way, heat generated due to operation of the light-emitting chip 451 may be transferred to the semiconductor cooler 458 through the substrate 452, and heat exchange is performed through the semiconductor cooler 458 to reduce an operating temperature of the light-emitting chip 451 and ensure life and performance of the light-emitting chip 451.

In some embodiments, as shown in FIG. 8, the light emitting assembly 450 further includes a plurality of laser driver chips 310 corresponding to the plurality of light-emitting chips 451. Each laser driver chip 310 is disposed on a surface of the circuit board 300, and is configured to drive a corresponding light-emitting chip 451 to emit an optical signal. For example, as shown in FIG. 8, the light emitting assembly 450 includes four laser driver chips 310 corresponding to the four light-emitting chips 451.

In some embodiments, the laser driver chip 310 is electrically connected to the circuit board 300 through a connection line (e.g., a gold line), the circuit board 300 is electrically connected to the substrate 452 through a connection line (e.g., a gold line), and the substrate 452 is electrically connected to the light-emitting chip 451 through a connection line (e.g., a gold line), so that the laser driver chip 310 is electrically connected to the light-emitting chip 451 through the connection line between the laser driver chip 310 and the circuit board 300, the circuit board 300, the connection line between the circuit board 300 and the substrate 452, the substrate 452, and the connection line between the substrate 452 and the light-emitting chip 451, and drives the light-emitting chip 451 to emit the optical signal.

After the laser driver chip 310 and the light-emitting chip 451 are electrically connected through the connection lines, the connection lines may be touched when other devices of the optical module 200 are installed, which may damage the connection lines. In some embodiments of the present disclosure, as shown in FIG. 8, in order to prevent the connection lines from being damaged, the light emitting assembly 450 further includes a protective cover 440. The protective cover 440 covers the light-emitting chips 451, the substrates 452, the first converging lenses 453, and the laser driver chips 310, and the protective cover 440 isolates the connection lines from other devices of the optical module 200, thereby preventing the connection lines from being damaged by the other devices. For example, the connection lines may be manufactured by a wire bonding process.

Figure 18:
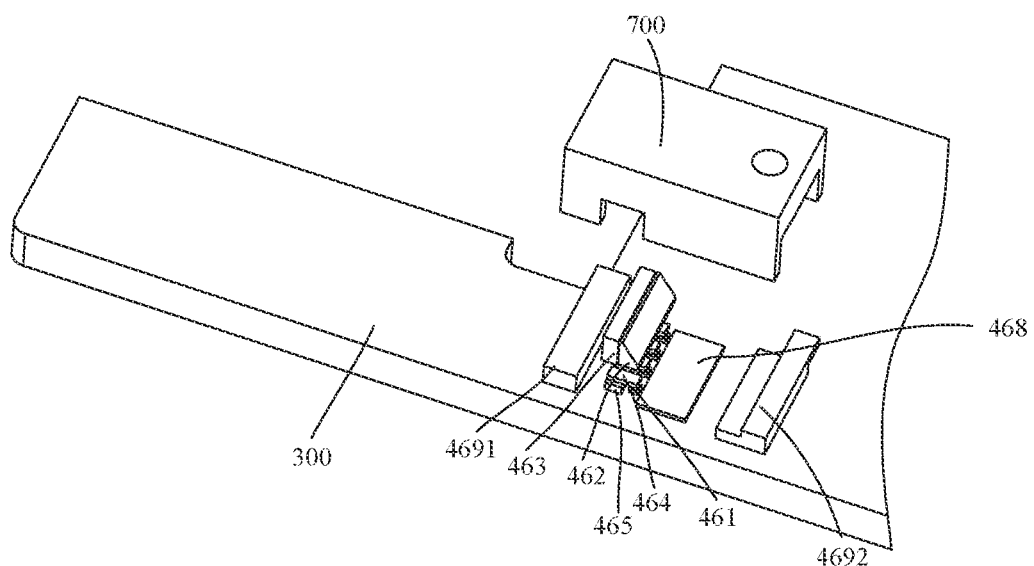
FIG. 18 is a partial exploded view of a circuit board and a light receiving assembly in an optical module, in accordance with some embodiments.
Figure 19:
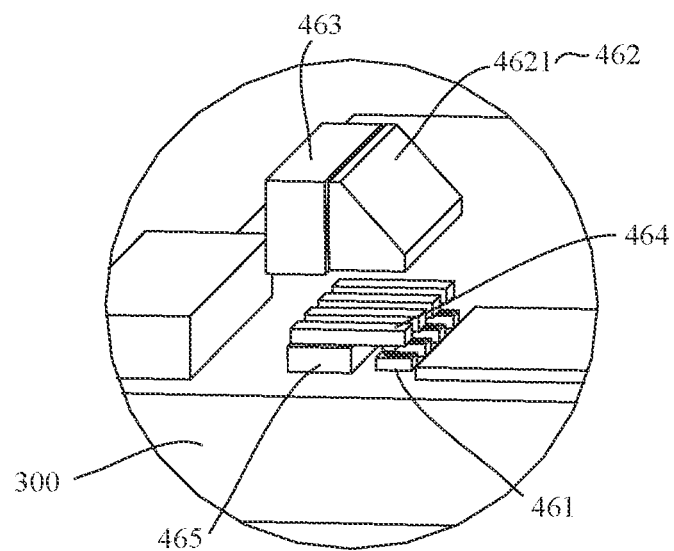
FIG. 19 is a partial enlarged view of a light receiving assembly in an optical module, in accordance with some embodiments.
Figure 20:
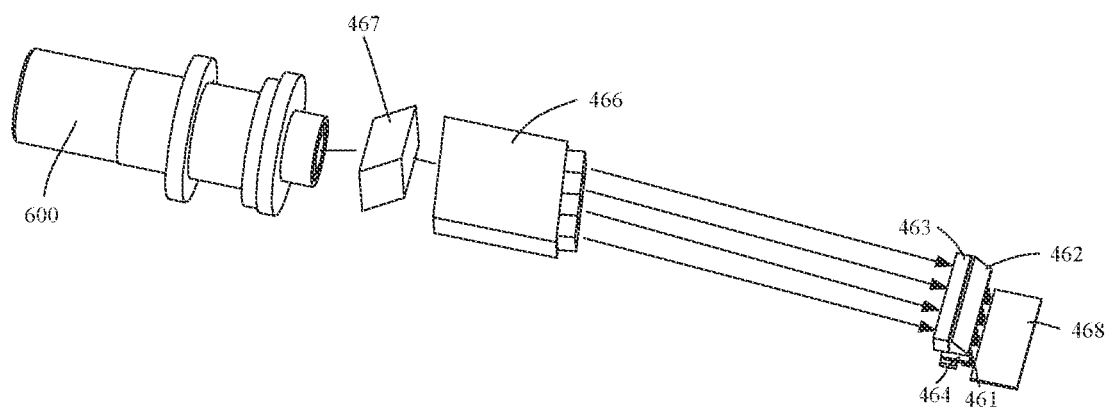
FIG. 20 is a schematic diagram of an optical path when a laser beam is received in an optical module, in accordance with some embodiments.
Figure 21:
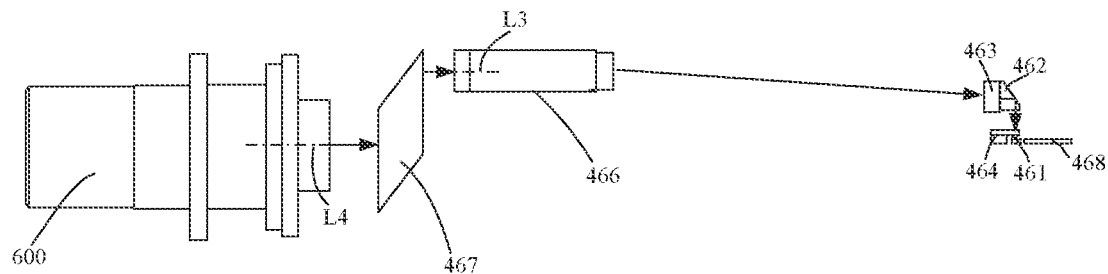
FIG. 21 is a side view of an optical path when a laser beam is received in an optical module, in accordance with some embodiments.

FIG. 18 is a partial exploded view of a circuit board and a light receiving assembly in an optical module in accordance with some embodiments, FIG. 19 is a partial enlarged view of a light receiving assembly in an optical module in accordance with some embodiments, FIG. 20 is a schematic diagram of an optical path when a laser beam is received in an optical module in accordance with some embodiments, and FIG. 21 is a side view of an optical path when a laser beam is received in an optical module in accordance with some embodiments. As shown in FIGS. 18 and 19, the light receiving assembly 460 includes a plurality of light-receiving chips 461. The plurality of light-receiving chips 461 are disposed on the surface of the circuit board 300, are arranged in a line in the width direction of the circuit board 300, and are configured to convert received optical signals into current signals. The light-receiving chip 461 is a photodetector, such as an avalanche diode and a photodiode. For example, as shown in FIG. 19, the light receiving assembly 460 includes four light-receiving chips 461. It will be understood that, the plurality of light-receiving chips 461 may also be referred to as a light-receiving chip array.

In some embodiments, as shown in FIGS. 10 and 20, the light receiving assembly 460 further includes an optical demultiplexer 466. The optical demultiplexer 466 is disposed on the inner wall of the first cover 420, is located between the second fiber optic adapter 600 and the plurality of light-receiving chips 461, and is configured to demultiplex a beam into a plurality of beams. A surface (i.e., a laser incident surface) of the optical demultiplexer 466 away from the light-receiving chip 461 has a beam inlet, and a surface (i.e., a laser exit surface) of the optical demultiplexer 466 proximate to the light-receiving chip 461 has a plurality of beam outlets that correspond to the plurality of light-receiving chips 461. A beam transmitted by the second fiber optic adapter 600 is incident into the optical demultiplexer 466 through the beam inlet and is demultiplexed into a plurality of beams by the optical demultiplexer 466, and then the plurality of beams are incident on corresponding light-receiving chips 461 through the plurality of beam outlets. For example, the optical demultiplexer 466 has four beam outlets corresponding to the four light-receiving chips 461.

In some embodiments, as shown in FIGS. 10 and 21, since a central axis L4 of a laser exit surface of the second fiber optic adapter 600 is not aligned with a central axis L3 of the beam inlet of the optical demultiplexer 466, and there is a height difference between the central axis L4 and the central axis L3 in the thickness direction of the circuit board 300, the light receiving assembly 460 further includes a second shift prism 467 to make the beam output by the second fiber optic adapter 600 incident on the optical demultiplexer 466. The second shift prism 467 is disposed on the inner wall of the first cover 420, is located between the second fiber optic adapter 600 and the optical demultiplexer 466, and is configured to refract and reflect a beam output by the second fiber optic adapter 600, so that a propagation direction of the beam is adjusted, and in turn the beam is coupled to the optical demultiplexer 466.

In some embodiments, as shown in FIG. 19, since the propagation direction of the plurality of beams output by the optical demultiplexer 466 is parallel to the surface of the circuit board 300, and a photosensitive surface of the light-receiving chip 461 is a surface thereof (i.e., a surface parallel to the circuit board 300) facing away from the circuit board 300, in order to ensure that the light-receiving chip 461 normally receives the optical signal, the light receiving assembly 460 further includes a reflection prism 462. The reflection prism 462 is disposed above the plurality of light-receiving chips 461, and covers the plurality of light-receiving chips 461. The reflection prism 462 is configured to change the propagation direction of the plurality of beams output by the optical demultiplexer 466, so that the propagation direction of the plurality of beams is changed from being parallel to the surface of the circuit board 300 to being perpendicular to the surface of the circuit board 300, and in turn, the plurality of beams are incident on the photosensitive surfaces of the plurality of light-receiving chips 461 in a direction perpendicular to the surface of the circuit board 300.

The reflection prism 462 has a reflective surface 4621, and the reflective surface 4621 covers the plurality of light-receiving chips 461 and is configured to reflect the plurality of beams output by the optical demultiplexer 466 onto the photosensitive surfaces of the plurality of light-receiving chips 461. In some embodiments, an oblique angle of the reflective surface 4621 is in a range of 40 degrees to 45 degrees with respect to a surface of the reflection prism 462 proximate to the light-receiving chip 461, and may be, for example, 40 degrees, 42 degrees, or 45 degrees.

In some embodiments, as shown in FIG. 19, the light receiving assembly 460 further includes a second converging lens array 463. The second converging lens array 463 is disposed on a laser incident side of the reflection prism 462. For example, the second converging lens array 463 is glued to the laser incident surface of the reflection prism 462. The second converging lens array 463 is configured to converge the plurality of beams output by the optical demultiplexer 466 to the reflection prism 462.

In some embodiments, the second converging lens array 463 includes a plurality of second converging lenses that are separately provided. Each second converging lens corresponds to one of the beam outlets of the optical demultiplexer 466 and is configured to converge a beam output from the corresponding beam outlet of the optical demultiplexer 466 into the reflection prism 462.

In some embodiments, to facilitate an assembly of the second converging lens array 463 and optical path coupling, the second converging lens array 463 is an integrated structure in a long strip shape. A surface of the second converging lens array 463 proximate to the reflection prism 462 has a plurality of protrusions, and each protrusion corresponds to one of the beam outlets of the optical demultiplexer 466 and is used as a converging lens. Each protrusion is configured to converge a beam output from the corresponding beam outlet of the optical demultiplexer 466 into the reflection prism 462. In a case where the optical path coupling is performed using the second converging lens array 463 having an integrated structure, the beams output from the beam outlets of the optical demultiplexer 466 may be integrally adjusted, and an optical path coupling efficiency and an assembling efficiency are higher as compared with a case of using the second converging lens array 463 composed of a plurality of independent second converging lenses.

In some embodiments, as shown in FIG. 19, since the beam reflected by the reflection prism 462 is a divergent beam, in order to transmit the reflected beam into the light-receiving chip 461, the light receiving assembly 460 further includes a plurality of third converging lenses 464 corresponding to the plurality of light-receiving chips 461. Each third converging lens 464 is disposed between the reflection prism 462 and a corresponding light-receiving chip 461 and is configured to converge the beam reflected by the reflection prism 462 to the corresponding light-receiving chip 461. In this way, the beam reflected by the reflection prism 462 is coupled to the light-receiving chip 461 through the third converging lens 464, so that the reflected beam can be accurately incident on the light-receiving chip 461, and a receiving efficiency of the light-receiving chip 461 is improved. For example, the light receiving assembly 460 includes four third converging lenses 464 corresponding to the four light-receiving chips 461. It will be understood that the plurality of third converging lenses 464 may also be referred to as a third converging lens array.

Generally, a photosensitive surface of a light-receiving chip in a high-speed optical module is less than a photosensitive surface of a light-receiving chip used in an existing low-speed optical module, and statistics show that an area of the photosensitive surface of the high-speed light-receiving chip is less than an area of the photosensitive surface of the low-speed light-receiving chip by approximately one quarter. Therefore, by providing the third converging lenses 464, it may be easier to ensure the receiving efficiency of the light-receiving chip 461, to shorten a distance between the light-receiving chip 461 and the reflection prism 462, to reduce a space between the light-receiving chip 461 and the reflection prism 462, and in turn, to save an occupied volume of the light receiving assembly 460 in the optical module 200.

In some embodiments of the present disclosure, a mounting tolerance of the light-receiving chip array composed of the plurality of independent light-receiving chips 461 increases relative to the integrated light-receiving chip array, and in turn, a difficulty of coupling the reflection prism 462 to the light-receiving chips 461 increases. Therefore, by using the third converging lens array composed of the plurality of independent third converging lenses 464, it may be easier to realize the optical path coupling from the reflection prism 462 to the light-receiving chips 461, to increase a coupling tolerance, and in turn, to reduce a difficulty of assembling process of the light receiving assembly 460.

In some embodiments, as shown in FIG. 19, to facilitate mounting of the third converging lens 464, the light receiving assembly 460 further includes a cushion block 465. The cushion block 465 is disposed on the circuit board 300 and is located on a side of the light-receiving chip 461. An end of each third converging lens 464 is disposed on the cushion block 465, and another end thereof is located above a corresponding light-receiving chip 461. The third converging lens 464 is fixedly mounted through the cushion block 465, a height of the cushion block 465 can be adjusted according to a requirement for a mounting height of the third converging lens 464, and in turn, it may be easier to mount the plurality of third converging lenses 464 at accurate positions, thereby ensuring an optical receiving efficiency of the light-receiving chip 461.

As shown in FIGS. 20 and 21, the second fiber optic adapter 600, the second shift prism 467, the optical demultiplexer 466, the second converging lens array 463, the reflection prism 462, the third converging lenses 464, and the light-receiving chips 461 are arranged sequentially in a direction of a receiving optical path. A beam transmitted by the second fiber optic adapter 600 is incident on the second shift prism 467, and is incident on the optical demultiplexer 466 after being refracted and reflected by the second shift prism 467, and then, the beam is demultiplexed into a plurality of beams by the optical demultiplexer 467. The plurality of beams are converged to the reflection prism 462 by the second converging lens array 463, and are incident on the plurality of third converging lens 464 after being reflected by the reflection prism 462, and then, the plurality of beams are coupled to the corresponding light-receiving chips 461 by the plurality of third converging lenses 464, so that receiving of the beam and photoelectric conversion are realized.

In some embodiments, as shown in FIG. 18, the light receiving assembly 460 further includes a transimpedance amplifier 468. The transimpedance amplifier 468 is mounted on the circuit board 300, and the plurality of light-receiving chips 461 are connected to the transimpedance amplifier 468. The transimpedance amplifier 468 is configured to receive the current signal generated by the light-receiving chip 461 and convert the received current signal into a voltage signal. For example, the transimpedance amplifier 468 is connected to the plurality of light-receiving chips 461 through connection lines, such as gold lines.

Since the longer the connection line is, the larger inductance generated by the connection line is, the greater signal mismatch will be, a signal output by the light-receiving chip 461 is a small signal, resulting in a decline in signal quality. Therefore, the transimpedance amplifier 468 is disposed on a side of the light-receiving chip 461 and is as close as possible to the light-receiving chip 461, so that a length of the connection line is shortened, and quality of signal transmission is ensured. In some embodiments, electrodes of the light-receiving chips 461 and pins of the transimpedance amplifier 468 are on a same plane, which ensures a shortest connection line between the light-receiving chips 461 and the transimpedance amplifier 468.

In some embodiments, as shown in FIG. 18, to facilitate fixing of the second converging lens array 463 and the reflection prism 462 and adjustment of a coupling optical path of the second converging lens array 463 and the reflection prism 462, the light receiving assembly 460 further includes an optical receiving case 700. The optical receiving case 700 covers the light-receiving chip 461 and the transimpedance amplifier 468, and the second converging lens array 463 and the reflection prism 462 are fixed on an inner wall of the optical receiving case 700. The plurality of beams output from the beam outlets of the optical demultiplexer 466 are transmitted to the second converging lens array 463 and the reflection prism 462 through an end of the optical receiving case 700.

Heights of the second converging lens array 463 and the reflection prism 462 may be adjusted by adjusting a distance from the optical receiving case 700 to the surface of the circuit board 300, so that the plurality of beams output by the optical demultiplexer 466 can be accurately incident on the second converging lens array 463, converged to the reflection prism 462 through the second converging lens array 463, and then reflected to the corresponding light-receiving chips 461 through the reflection prism 462. In addition, when coupling of a receiving optical path is required, the second converging lens array 463 and the reflection prism 462 may be fixed and assembled onto the optical receiving case 700, and then the optical receiving case 700 is clamped and moved, so as to move the second converging lens array 463 and the reflection prism 462. As a result, clamping and movement of the second converging lens array 463 and the reflection prism 462 are realized, and the coupling efficiency of the optical path is further improved.

Meanwhile, since the second converging lens array 463 and the reflection prism 462 are usually made of a material such as silicon, the second converging lens array 463 and the reflection prism 462 are easily scratched if the second converging lens array 463 and the reflection prism 462 are directly clamped. Therefore, through the optical receiving case 700, damages such as scratching and pinching caused by clamping the second converging lens array 463 and the reflection prism 462 can be avoided. Fixing the second converging lens array 463 and the reflection prism 462 through the optical receiving case 700 facilitates simplification of process for coupling and assembly of the second converging lens array 463 and the reflection prism 462.

In some embodiments, as shown in FIG. 18, in order to adjust the distance from the optical receiving case 700 to the surface of the circuit board 300, the light receiving assembly 460 further includes a first adjusting plate 4691 and a second adjusting plate 4692. The first adjusting plate 4691 and the second adjusting plate 4692 are disposed on the circuit board 300, and are located on two sides of the light-receiving chip 461, respectively. An end of the optical receiving case 700 is located on the first adjusting plate 4691, and another end of the optical receiving case 700 is located on the second adjusting plate 4692, so that the optical receiving case 700 is supported and fixed by the first adjusting plate 4691 and the second adjusting plate 4692, and a distance from the optical receiving case 700 to the circuit board 300 increases. For example, the first adjusting plate 4691 and the second adjusting plate 4692 are respectively disposed on two opposite sides of the light-receiving chip 461 in a length direction of the circuit board 300.

Thus, in a case where positions of the second converging lens array 463 and the reflection prism 462 in an optical path of the received beam are adjusted for coupling of the optical path, the optical receiving case 700 moves on the first adjusting plate 4691 and the second adjusting plate 4692, which may effectively prevent devices such as the light-receiving chip 461 from being touched due to movement of the optical receiving case 700, and in turn, prevent the devices such as the light-receiving chip 461 from being damaged. Flatness of installation of the optical receiving case 700 is ensured through the first adjusting plate 4691 and the second adjusting plate 4692, and in turn, accuracy and flatness of mounting positions of the second converging lens array 463 and the reflection prism 462 are ensured, errors of the received optical path are reduced, and stability of the optical path increases.

Figure 22:
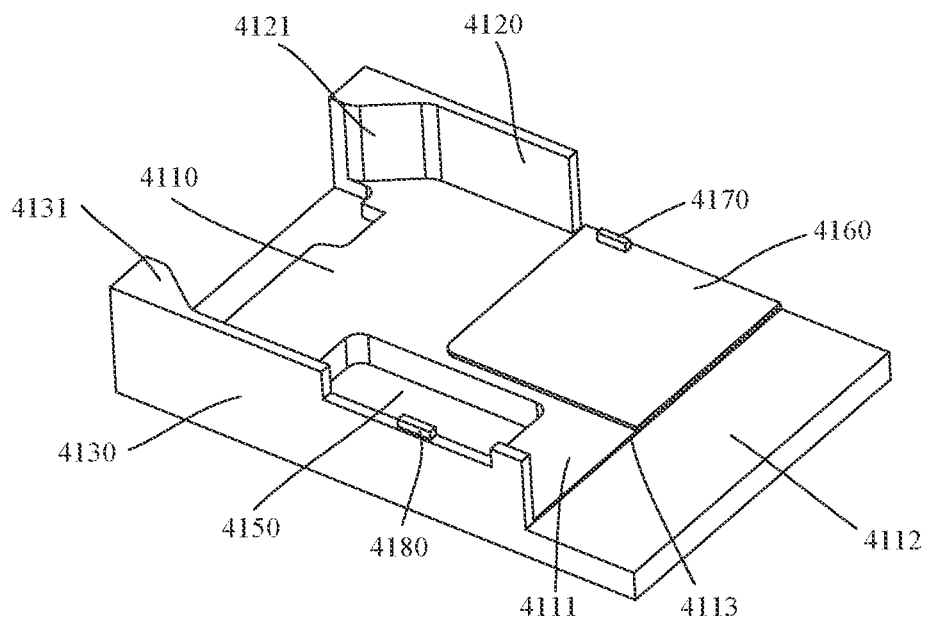
FIG. 22 is a structural diagram of a base in an optical module, in accordance with some embodiments.
Figure 23:
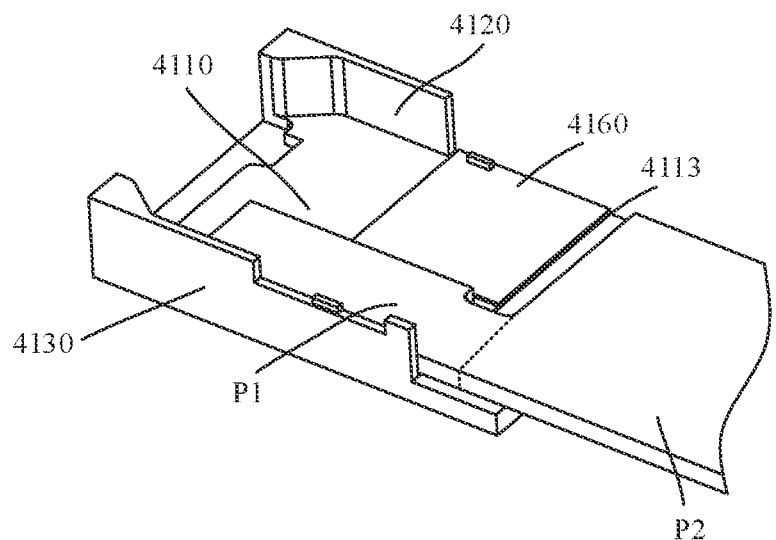
FIG. 23 is an assembly diagram of a base and a circuit board in an optical module, in accordance with some embodiments.

FIG. 22 is a structural diagram of a base in an optical module in accordance with some embodiments, and FIG. 23 is an assembly diagram of a base and a circuit board in an optical module in accordance with some embodiments. As shown in FIGS. 22 and 23, the base 410 includes a first bottom plate 4110, a first lower side plate 4120 and a second lower side plate 4130. The first lower side plate 4120 and the second lower side plate 4130 are connected to the first bottom plate 4110, and the first lower side plate 4120 and the second lower side plate 4130 are disposed oppositely. The plurality of light-emitting chips 451, the plurality of substrates 452, the semiconductor cooler 458, the plurality of first converging lenses 453, the plurality of first collimating lenses 454, and the plurality of glass blocks 455 are supported by the first bottom plate 4110.

The first bottom plate 4110 includes a first step surface 4111, a second step surface 4112, and a first connecting surface 4113. The first step surface 4111 is higher than the second step surface 4112, and the first connecting surface 4113 is connected to the first step surface 4111 and the second step surface 4112.

The base 410 further includes a supporting stage 4160, and the supporting stage 4160 is disposed on the first step surface 4111 of the first bottom plate 4110. A surface of the supporting stage 4160 away from the first connecting surface 4113 is in contact with a surface of the first lower side plate 4120 proximate to the first connecting surface 4113, and a surface of the supporting stage 4160 proximate to the first connecting surface 4113 is flush with the first connecting surface 4113, that is, a left side surface of the supporting stage 4160 abuts against a right side surface of the first lower side plate 4120, and a right side surface of the supporting stage 4160 is flush with the first connecting surface 4113.

As shown in FIGS. 7 and 8, the circuit board 300 includes a first portion P1, a second portion P2, and a circuit board notch P3, and a width of the first portion P1 is less than a width of the second portion P2, so that the circuit board notch P3 is formed. The first portion P1 is inserted into the base 410, and the circuit board notch P3 is used to avoid the semiconductor cooler 458, the substrates 452, the light-emitting chips 451, the first converging lenses 453, the glass blocks 455, the first collimating lenses 454, the optical multiplexer 456, and the first shift prism 457 of the light emitting assembly 450.

As shown in FIG. 23, the first portion P1 of the circuit board 300 is disposed on the first step surface 4111, and the supporting stage 4160 is located in the circuit board notch P3, that is, the first portion P1 of the circuit board 300 is located between the second lower side plate 4130 and the supporting stage 4160. A surface of the second portion P2 of the circuit board 300 proximate to the first portion P1 abuts against the first connecting surface 4113, thereby positioning the second portion P2. A surface of the first portion P1 of the circuit board 300 away from the second lower side plate 4130 abuts against a surface of the supporting stage 4160 proximate to the second lower side plate 4130, and a surface of the first portion P1 of the circuit board 300 proximate to the second lower side plate 4130 is in contact with the second lower side plate 4130, thereby positioning the first portion P1. After positioning, a surface of the circuit board 300 proximate to the first bottom plate 4110 is bonded to the second step surface 4112 by glue, so that the circuit board 300 is fixed to the base 410.

The semiconductor cooler 458, the plurality of first collimating lenses 454 and the plurality of glass blocks 455 of the light emitting assembly 450 are disposed on the supporting stage 4160 and located in the circuit board notch P3. The plurality of substrates 452 and the plurality of first converging lenses 453 are disposed on the semiconductor cooler 458, and the plurality of light-emitting chips 451 are correspondingly disposed on the plurality of substrates 452, that is, the light-emitting chips 451 and the first converging lenses 453 are disposed on the supporting stage 4160 through the semiconductor cooler 458. The semiconductor cooler 458 is electrically connected to the first portion P1 of the circuit board 300, and the light-emitting chips 451 are electrically connected to the second portion P2 of the circuit board 300.

The light-emitting chips 451, the first converging lenses 453, and the first collimating lenses 454 are disposed proximate to the first lower side plate 4120, and the first portion P1 of the circuit board 300 is disposed proximate to the second lower side plate 4130. An extending length of the first lower side plate 4120 is shorter than an extending length of the second lower side plate 4130, and the first lower side plate 4120 does not extend to an outer side (i.e., a side away from the second lower side plate 4130) of the first collimating lens array. This design facilitates assembly of the light-emitting chips 451, the first converging lenses 453, the first collimating lenses 454, etc. on the first bottom plate 4110, and a large operating space is provided.

Figure 24:
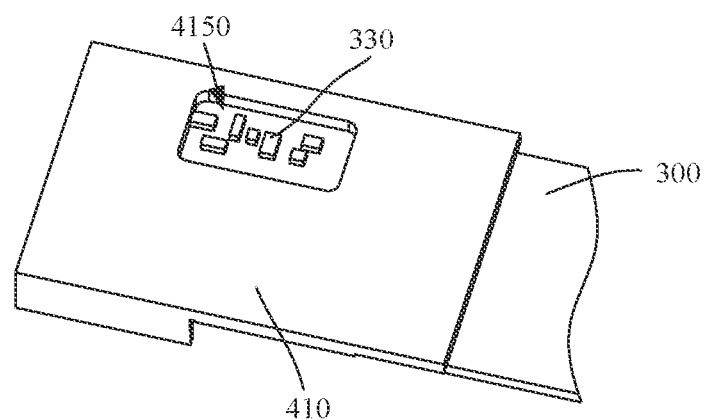
FIG. 24 is an assembly diagram of a base and a circuit board in an optical module from another angle, in accordance with some embodiments.

FIG. 24 is an assembly diagram of a base and a circuit board in an optical module from another angle in accordance with some embodiments. As shown in FIG. 24, since the surface of the first portion P1 of the circuit board 300 proximate to the first bottom plate 4110 is provided with an electronic device 330, in order to avoid the electronic device 330 on the first portion P1, the first bottom plate 4110 of the base 410 has an avoidance hole 4150, and the avoidance hole 4150 corresponds to the electronic device 330 on the first portion P1, so that a portion of the surface of the first portion P1 can be exposed, and the electronic device 330 is disposed on the exposed surface of the first portion P1. As a result, a narrow space of the optical module is fully utilized, and a connection strength between the circuit board 300 and the base 410 and layout rationality of the electronic device on the circuit board 300 are ensured.

As shown in FIG. 22, the base 410 further includes a first protrusion 4121 and a second protrusion 4131. The first protrusion 4121 is disposed on a surface of the first lower side plate 4120 facing the second lower side plate 4130, and is located at an end portion of the first lower side plate 4120. The second protrusion 4131 is disposed on a surface of the second lower side plate 4130 facing the first lower side plate 4120, and is located at an end portion of the second lower side plate 4130.

Figure 11:
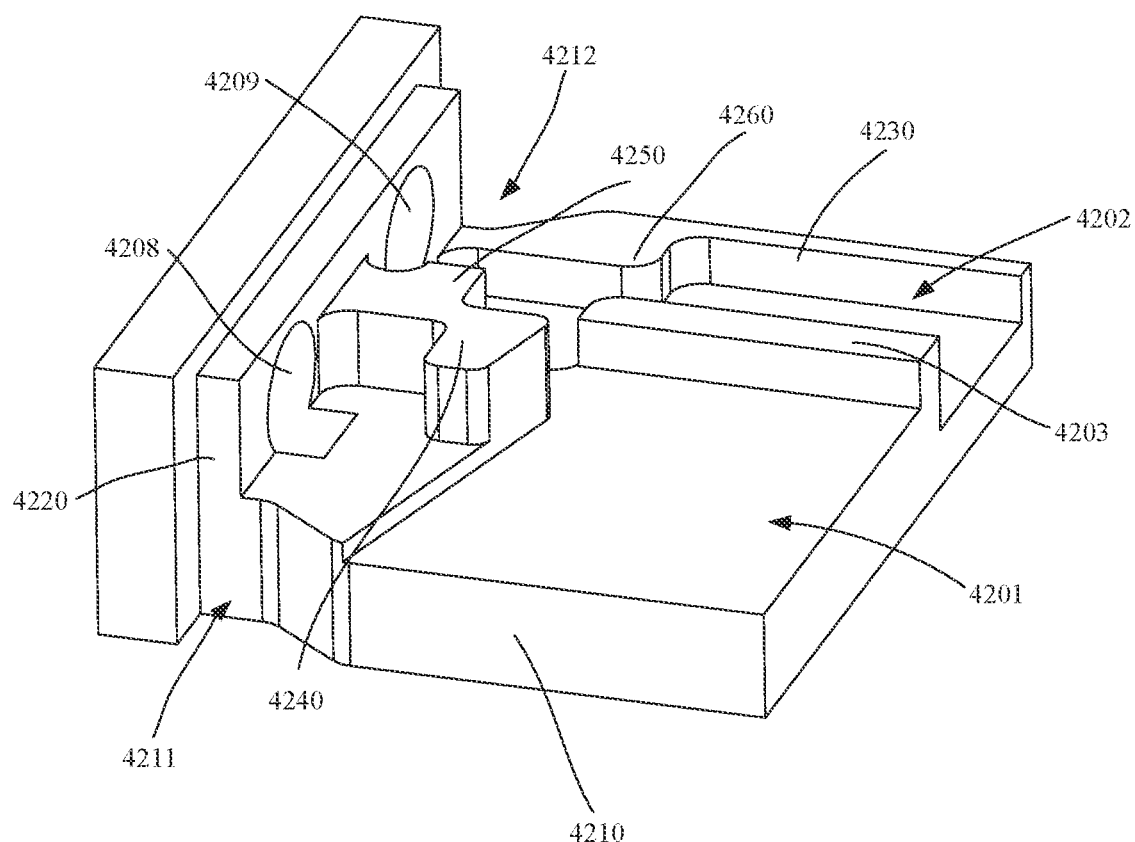
FIG. 11 is a structural diagram of a first cover in an optical module, in accordance with some embodiments.
Figure 12:
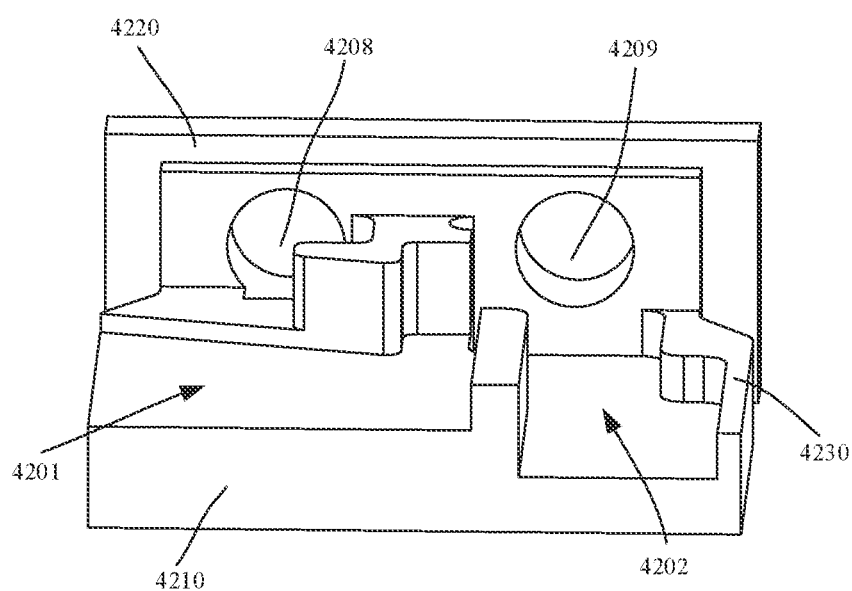
FIG. 12 is a structural diagram of a first cover in an optical module from another angle, in accordance with some embodiments.

FIG. 11 is a structural diagram of a first cover in an optical module in accordance with some embodiments, and FIG. 12 is a structural diagram of a first cover in an optical module from another angle in accordance with some embodiments. As shown in FIGS. 10 to 12, the first cover 420 includes a first top plate 4210, a first upper side plate 4220, and a second upper side plate 4230. The first upper side plate 4220 and the second upper side plate 4230 are both connected to the first top plate 4210, and the first upper side plate 4220 is connected to the second upper side plate 4230, that is, the first upper side plate 4220 is adjacent to the second upper side plate 4230.

In a case where the first cover 420 covers the base 410, the first upper side plate 4220 and end portions of the first lower side plate 4120 and the second lower side plate 4130 of the base 410 may be bonded together by glue, and the first fiber optic adapter 500 and the second fiber optic adapter 600 are disposed on the first upper side plate 4220. A side wall of the first top plate 4210 away from the second upper side plate 4230 is connected to the first lower side plate 4120, and the second upper side plate 4230 is connected to the second lower side plate 4130, so that fixing of the base 410 and the first cover 420 is realized.

The first cover 420 further includes a partition plate 4203, and the partition plate 4203 is disposed on the first top plate 4210 in a direction perpendicular to the first upper side plate 4220, so that the first cover 420 is partitioned into two cavities. The first cover 420 has a first cavity 4201 and a second cavity 4202, and the first cavity 4201 and the second cavity 4202 are arranged side by side in the width direction of the circuit board 300.

The first shift prism 457 and the optical multiplexer 456 of the light emitting assembly 450 are both located in the first cavity 4201, and the first fiber optic adapter 500 is inserted into the first cavity 4201 of the first cover 420. The optical multiplexer 456 is glued to a surface of the first cavity 4201, the first shift prism 457 is glued to the surface of the first cavity 4201, and the first shift prism 457 is located between the first fiber optic adapter 500 and the optical multiplexer 456, so that a composite beam output by the optical multiplexer 456 is input into the first shift prism 457, and the composite beam, after being reflected and refracted by the first shift prism 457, is coupled into the first fiber optic adapter 500.

The second shift prism 467 and the optical demultiplexer 466 of the light receiving assembly 460 are both located in the second cavity 4202, and the second fiber optic adapter 600 is inserted into the second cavity 4202 of the first cover 420. The optical demultiplexer 466 is glued to a surface of the second cavity 4202, the second shift prism 467 is glued to the surface of the second cavity 4202, and the second shift prism 467 is located between the second fiber optic adapter 600 and the optical demultiplexer 466, so that a composite beam transmitted by the second fiber optic adapter 600, after being reflected and refracted by the second shift prism 467, is coupled into the optical demultiplexer 466, and the composite beam is demultiplexed into a plurality of beams with different wavelengths by the optical demultiplexer 466.

After the first cover 420 is mounted to the base 410, the optical multiplexer 456 and the first shift prism 457 are disposed proximate to the first lower side plate 4120, and the optical demultiplexer 466 and the second shift prism 467 are disposed proximate to the second lower side plate 4130.

The first cover 420 has a first notch 4211 and a second notch 4212. The first notch 4211 is disposed on a side of the first top plate 4210 and is located at a joint between the first top plate 4210 and the first upper side plate 4220. The second notch 4212 is disposed on another side of the first top plate 4210 and is located at a joint between the first top plate 4210, the second upper side plate 4230, and the first upper side plate 4220. The first protrusion 4121 is embedded into the first notch 4211, and the second protrusion 4131 is embedded into the second notch 4212.

An end of the first upper side plate 4220 protrudes relative to the first notch 4211, and the first protrusion 4121 is embedded into the first notch 4211 and is fixedly connected to the first upper side plate 4220; and another end of the first upper side plate 4220 protrudes relative to the second notch 4212, and the second protrusion 4131 is embedded into the second notch 4212 and is fixedly connected to the first upper side plate 4220. For example, the fixed connection is welding. There is a gap between a side wall of the first top plate 4210 away from the second upper side plate 4230 and an inner wall of the first lower side plate 4120, and glue is dispensed at the gap to fix the first top plate 4210 and the first lower side plate 4120. There is a gap between an outer wall of the second upper side plate 4230 and an inner wall of the second lower side plate 4130, and glue is dispensed at the gap to fix the second upper side plate 4230 and the second lower side plate 4130.

In the embodiments of the present disclosure, the first portion P1 is located below the second shift prism 467 and the optical demultiplexer 466, that is, after the first cover 420 is mounted above the base 410, there is a gap between the second shift prism 467 and the optical demultiplexer 466 in the first cover 420 and the first bottom plate 4110 of the base 410, and the first portion P1 of the circuit board 300 is embedded in the gap to increase an area of the circuit board 300 on which the electronic device is provided.

The first upper side plate 4220 has a first through hole 4208 and a second through hole 4209, the first fiber optic adapter 500 is fixed onto the first upper side plate 4220 through the first through hole 4208, and the second fiber optic adapter 600 is fixed onto the first upper side plate 4220 through the second through hole 4209.

The first cover 420 further includes a first fixing protrusion 4240, and the first fixing protrusion 4240 is disposed at a position of the first top plate 4210 proximate to the first through hole 4208. A surface of the first fixing protrusion 4240 away from the first upper side plate 4220 is a flat surface, the laser exit surface of the optical multiplexer 456 is glued to the surface of the first fixing protrusion 4240 away from the first upper side plate 4220, a surface of the optical multiplexer 456 proximate to the first top plate 4210 is glued to the first top plate 4210, and a surface of the optical multiplexer 456 proximate to the partition plate 4203 is glued to the partition plate 4203, so that the optical multiplexer 456 is fixed onto the first top plate 4210. The laser exit surface of the optical multiplexer 456 has a beam outlet, and a laser incident surface of the first shift prism 457 is glued to the laser exit surface of the optical multiplexer 456 and corresponds to the beam outlet, so as to receive the composite beam output by the optical multiplexer 456. A laser exit surface of the first shift prism 457 corresponds to the first through hole 4208, and the composite beam, after being refracted and reflected by the first shift prism 457, is incident on the first fiber optic adapter 500 in the first through hole 4208.

The first cover 420 further includes a second fixing protrusion 4250 and a third fixing protrusion 4260. The second fixing protrusion 4250 is disposed at a position of the first top plate 4210 proximate to the second through hole 4209, and the third fixing protrusion 4260 is disposed on a surface of the second upper side plate 4230 facing the partition plate 4203 and is located at an end portion of the second upper side plate 4230 proximate to the first upper side plate 4220. The laser incident surface of the optical demultiplexer 466 is glued to the third fixing protrusion 4260, a surface of the optical demultiplexer 466 proximate to the first top plate 4210 is glued to the first top plate 4210, and a surface of the optical demultiplexer 466 proximate to the partition plate 4203 is glued to the partition plate 4203, so that the optical demultiplexer 456 is fixed onto the first top plate 4210. A surface of the second fixing protrusion 4250 proximate to the second upper side plate 4230 is a flat surface, a surface of the second shift prism 467 away from the second upper side plate 4230 is glued to the surface of the second fixing protrusion 4250 proximate to the second upper side plate 4230, a surface of the second shift prism 467 proximate to the first top plate 4210 is glued to the first top plate 4210, a laser incident surface of the second shift prism 467 corresponds to the second through hole 4209, and a laser exit surface of the second shift prism 467 corresponds to the beam inlet of the optical demultiplexer 466. A beam transmitted by the second fiber optic adapter 600, after being refracted and reflected by the second shift prism 467, is incident on the optical demultiplexer 466, and the beam is demultiplexed into a plurality of beams with different wavelengths by the optical demultiplexer 466.

As shown in FIG. 12, a height of a surface of the first cavity 4201 in the first cover 420 may be different from a height of a surface of the second cavity 4202. For example, the second cavity 4202 is recessed relative to the first cavity 4201, the first cover 420 covers the base 410, and the first top plate 4210 of the first cover 420 faces the upper shell 201, so that the optical demultiplexer 466 in the second cavity 4202 is higher than the optical multiplexer 456 in the first cavity 4201. As a result, it helps to transmit the plurality of beams output by the optical demultiplexer 466 to the light-receiving chips 461 and prevent the emitting beams from causing crosstalk to the receiving beams.

Since the received beam is converted from a parallel beam into a perpendicular beam by the reflection prism 462, a height from the light-receiving chip 461 to the surface of the circuit board 300 is lower than a height from the optical demultiplexer 466 to the surface of the circuit board 300. In some embodiments of the present disclosure, a fixed height of the optical demultiplexer 466 on the first cover 420 increases by recessing the second cavity 4202 of the first cover 420 relative to the first cavity 4201.

Moreover, the laser incident surface (the photosensitive surface) of the light-receiving chip 461 is a top surface of the light-receiving chip 461, and therefore, there is a height difference between the beam output by the optical demultiplexer 466 and the laser incident surface of the light-receiving chip 461. The laser exit surface of the light-emitting chip 461 is a side surface of the light-emitting chip 461, and therefore, the beam output by the light-emitting chip 461 and an optical path of a beam received by the optical multiplexer 456 are located at a same height. Therefore, in order to realize emission and receiving of the laser beam, the surface of the second cavity 4202 on which the optical demultiplexer 466 is fixed is recessed relative to the surface of the first cavity 4201 on which the optical multiplexer 456 is fixed.

In the embodiments of the present disclosure, the first shift prism 457, the optical multiplexer 456, the second shift prism 467, and the optical demultiplexer 466 are all disposed on the first cover 420, and then the first cover 420 with the first shift prism 457, the optical multiplexer 456, the second shift prism 467, and the optical demultiplexer 466 fixed thereon is mounted on the base 410, so that the optical transceiving assembly 400 can be mounted from a plurality of angles, which makes the operating space large and is beneficial to improving an assembly efficiency of the optical transceiving assembly 400.

Figure 25:
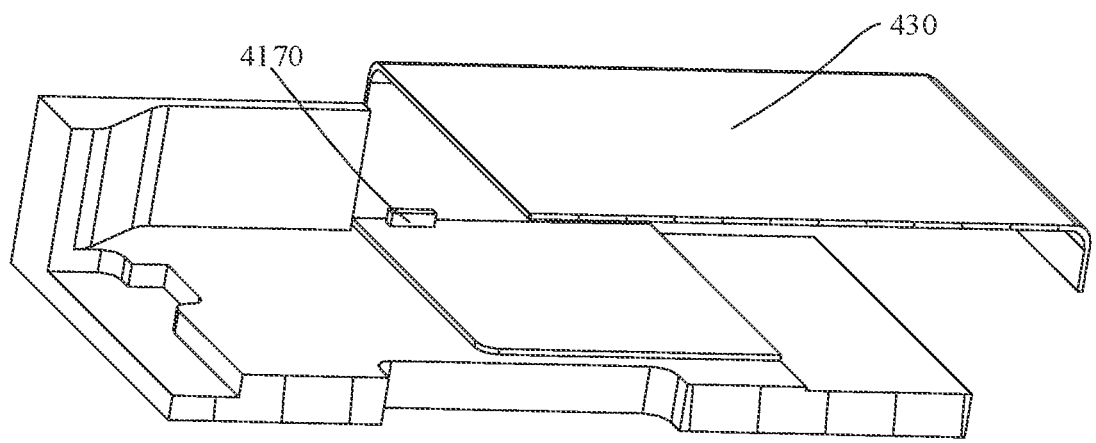
FIG. 25 is an assembly sectional view of a base and a second cover in an optical module, in accordance with some embodiments.

FIG. 25 is an assembly sectional view of a base and a second cover in an optical module in accordance with some embodiments. As shown in FIGS. 6, 22 and 25, the second cover 430 includes a second top plate 4310, and a third upper side plate 4320 and a fourth upper side plate 4330 that are connected to the second top plate 4310 and disposed oppositely. The third upper side plate 4320 and the fourth upper side plate 4330 are respectively connected to the first lower side plate 4120 and the second lower side plate 4130 of the base 410. A surface of the third upper side plate 4320 away from the connecting finger 301 of the circuit board 300 is in contact with a surface of the first lower side plate 4120 proximate to the first connecting surface 4113, that is, a left side surface of the third upper side plate 4320 is in contact with a right side surface of the first lower side plate 4120.

The base 410 further includes a first boss 4170 disposed on the supporting stage 4160, and a surface of the third upper side plate 4320 facing the second lower side plate 4130 is fixedly connected to the first boss 4170. That is, a surface of the first boss 4170 away from the second lower side plate 4130 abuts against an inner wall of the third upper side plate 4320 of the second cover 430, and a contact portion is fixed by laser welding. The base 410 further includes a second boss 4180 disposed on the second lower side plate 4130. The second boss 4180 is disposed opposite to the first boss 4170, and a surface of the fourth upper side plate 4330 of the second cover 430 facing the first lower side plate 4120 is fixedly connected to the second boss 4180. That is, a surface of the second boss 4180 away from the first lower side plate 4120 abuts against an inner wall of the fourth upper side plate 4330 of the second cover 430, and a contact portion is fixed by laser welding, so that a fixed connection between the base 410 and the second cover 430 is achieved, After the light-emitting chips 451, the first converging lenses 453, the substrates 452, the semiconductor cooler 458, the glass blocks 455, and the first collimating lenses 454 of the light emitting assembly 450 are fixed to the first bottom plate 4110 of the base 410; the first shift prism 457 and the optical multiplexer 456 of the light emitting assembly 450, and the second shift prism 467 and the optical demultiplexer 466 of the light receiving assembly 460 are fixed to the first top plate 4210 of the first cover 420; the first portion P1 of the circuit board 300 is fixed inside the base 410; and the third converging lenses 464, the light-receiving chips 461, the transimpedance amplifier 468, and the optical receiving case 700 on which the second converging lens array 463 and the reflection prism 462 are installed are fixed onto the circuit board 300; the base 410 and the first cover 420 are bonded together; and then the second cover 430 is fixed to the base 410, so that the optical transceiving assembly 400 is formed through assembly, and an electrical connection of the optical transceiving assembly 400 to the circuit board 300 is realized.

In some embodiments of the present disclosure, the light emitting assembly 450 and the light receiving assembly 460 are respectively fixed in the base 410, the first cover 420, and the optical receiving case 700, which improves an integration level of the optical transceiving assembly and facilitates miniaturization development of the optical module.

Figure 13:
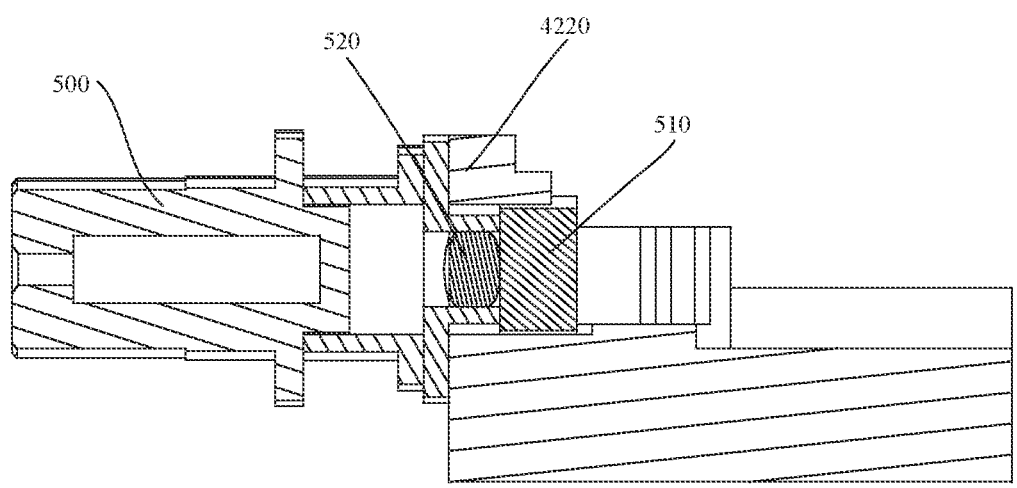
FIG. 13 is a cross-sectional view of a first fiber optic adapter and a first cover in an optical module, in accordance with some embodiments.

FIG. 13 is a cross-sectional view of a first fiber optic adapter and a first cover in an optical module in accordance with some embodiments. As shown in FIG. 13, in a case where the composite beam is incident on the first fiber optic adapter 500 via the first shift prism 457, the beam is easily reflected on the laser incident surface of the first fiber optic adapter 500, and the beam after reflection is incident on the optical multiplexer 456 via the first shift prism 457, which will easily interfere with an emitted beam. Therefore, the optical module 200 further includes an isolator 510. The isolator 510 is embedded in the first through hole 4208 and is located between the first shift prism 457 and the first fiber optic adapter 500 and is used to eliminate the beam reflected by the laser incident surface of the first fiber optic adapter 500, which avoids crosstalk of a reflected beam to the emitted beam.

To facilitate coupling of the composite beam output by the first shift prism 457 into the first fiber optic adapter 500, the optical module 200 further includes a first lens 520. The first lens 520 is embedded in the first through hole 4208 and located between the isolator 510 and the first fiber optic adapter 500, and the first lens 520 is used to convert the composite beam transmitted through the isolator 510 into a convergent beam, and then the convergent beam is coupled to the laser incident surface of the first fiber optic adapter 500, so as to implement beam emission through the first fiber optic adapter 500.

Figure 14:
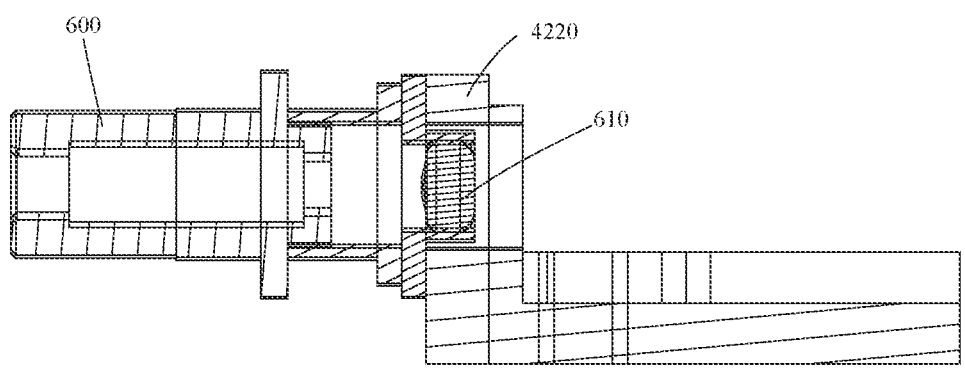
FIG. 14 is a cross-sectional view of a second fiber optic adapter and a first cover in an optical module, in accordance with some embodiments.

FIG. 14 is a cross-sectional view of a second fiber optic adapter and a first cover in an optical module in accordance with some embodiments. As shown in FIG. 14, in a case where the beam transmitted by the second fiber optic adapter 600 is incident on the optical demultiplexer 466, the beam transmitted by the second fiber optic adapter 600 is a divergent beam. In order to make the divergent beam incident on the optical demultiplexer 466 through the second shift prism 467, the optical module 200 further includes a second lens 610. The second lens 610 is embedded in the second through hole 4209 and located between the second shift prism 467 and the second fiber optic adapter 600, and the second lens 610 is used to convert the beam transmitted in the second fiber optic adapter 600 into a parallel beam (i.e., a collimated beam). The parallel beam, after being refracted and reflected by the second shift prism 467, is incident on the optical demultiplexer 466, and then the parallel beam is demultiplexed into a plurality of beams with different wavelengths by the optical demultiplexer 466.

Figure 15:
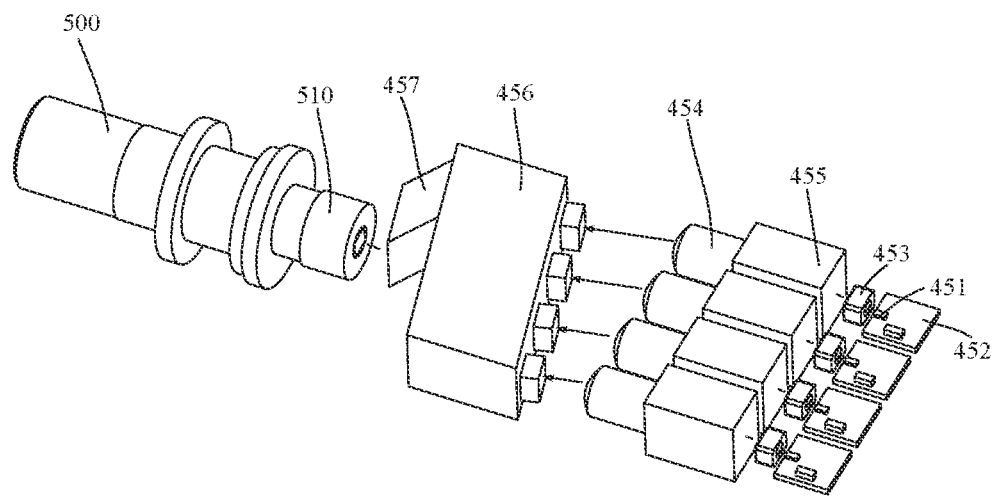
FIG. 15 is an optical path diagram when a laser beam is emitted in an optical module, in accordance with some embodiments.

FIG. 15 is an optical path diagram when a laser beam is emitted in an optical module, in accordance with some embodiments. As shown in FIG. 15, the light-emitting chips 451, the first converging lenses 453, the glass blocks 455, the first collimating lenses 454, the optical multiplexer 456, the first shift prism 457, the isolator 510, the first lens 520, and the first fiber optic adapter 500 are sequentially arranged in a laser emission direction. The laser beams generated by the light-emitting chips 451 are converted into beams with a small divergence angle by the first converging lenses 453, the beams with the small divergence angle, after passing through the glass blocks 455, are incident on the first collimating lenses 454, and are converted into collimated beams by the first collimating lenses 454. The collimated beams are incident on the beam inlets of the optical multiplexer 456, and the plurality of collimated beams are multiplexed into a composite beam by the optical multiplexer 456. The composite beam is incident on the first shift prism 457 through the beam outlet of the optical multiplexer 456 and passes through the isolator 510 after being refracted and reflected by the first shift prism 457. The composite beam passing through the isolator 510 is coupled to the first fiber optic adapter 500 through the first lens 520. Emission of the beam is achieved.

Figure 16:
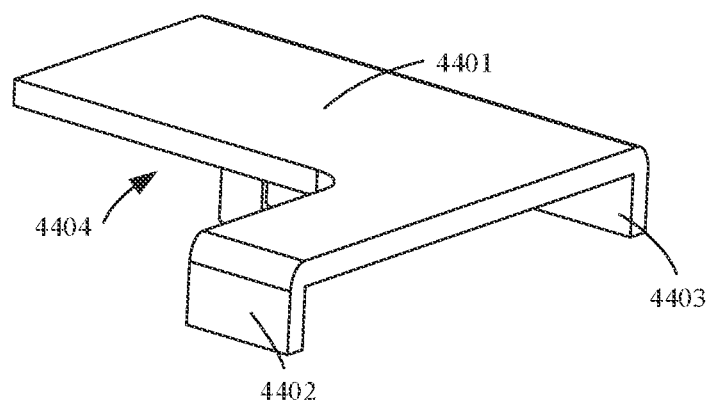
FIG. 16 is a structural diagram of a protective cover in an optical module, in accordance with some embodiments.
Figure 17:
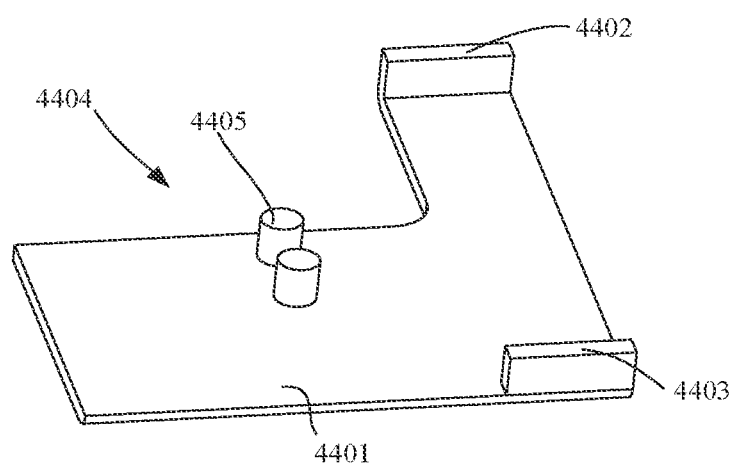
FIG. 17 is a structural diagram of a protective cover in an optical module from another angle, in accordance with some embodiments.

FIG. 16 is a structural diagram of a protective cover in an optical module in accordance with some embodiments, and FIG. 17 is a structural diagram of a protective cover in an optical module from another angle in accordance with some embodiments. As shown in FIGS. 16 and 17, the protective cover 440 includes a top plate 4401, a first support plate 4402 and a second support plate 4403, the first support plate 4402 and the second support plate 4403 are connected to the top plate 4401, and the first support plate 4402 and the second support plate 4403 are disposed oppositely. Thus, the protective cover 440 is a U-shaped cover composed of the top plate 4401, the first support plate 4402 and the second support plate 4403, so that the light-emitting chips 451, the substrates 452, and the laser driver chips 310 are covered under the U-shaped cover.

Lengths of the first support plate 4402 and the second support plate 4403 are each less than a length of the top plate 4401; that is, the first support plate 4402 and the second support plate 4403 are connected to an end (a right end in FIG. 17) of the top plate 4401, surfaces of the first support plate 4402 and the second support plate 4403 that are away from the top plate 4401 are both glued to the surface of the circuit board 300, and an end of the top plate 4401 away from the first support plate 4402 and the second support plate 4403 is fixed to the glass blocks 455, so that the protective cover 440 is fixed above the circuit board 300 and the base 410.

In order to support the top plate 4401, the protective cover 440 further includes a plurality of support pillars 4405, an end of each of the support pillars 4405 is connected to an inner surface (i.e., a surface proximate to the first support plate 4402 and the second support plate 4403) of the top plate 4401, another end of each of the support pillars 4405 is glued to the surface of the circuit board 300, and the support pillars 4405 are disposed at a middle position of the top plate 4401, so as to support a middle portion of the top plate 4401 and prevent an end (a left end in FIG. 17) of the top plate 4401 away from the first support plate and the second support plate from touching gold lines or other devices.

In the embodiments of the present disclosure, the top plate 4401 has a top plate notch 4404, the top plate notch 4404 extends in a length direction of the top plate 4401, and a size of the top plate notch 4404 in the length direction of the top plate 4401 is less than a length of the top plate 4401. The top plate notch 4404 extends in a width direction of the top plate 4401, and a size of the top plate notch 4404 in the width direction of the top plate 4401 is less than a width of the top plate 4401. The top plate notch 4404 faces the light receiving assembly 460, and is used to avoid a region where the light-receiving chips 461 of the light receiving assembly 460 are located.

A surface (i.e., a left side surface) of the first support plate 4402 away from the connecting finger 301 of the circuit board 300 is flush with the top plate notch 4404, a surface (i.e., a right side surface) of the first support plate 4402 proximate to the connecting finger 301 of the circuit board 300 is flush with a surface (i.e., a right side surface) of the top plate 4401 proximate to the connecting finger 301 of the circuit board 300, and a size of the second support plate 4403 in a left-right direction is same as a size of the first support plate 4402 in the left-right direction.

The top plate 4401 covers the light-emitting chips 451, the first converging lenses 453, the substrates 452, and the laser driver chips 310 on the circuit board 300 through the first support plate 4402, the second support plate 4403, and the support pillars 4405, and is used to protect the connection lines from the laser driver chips 310 to the circuit board 300, the connection lines from the circuit board 300 to the substrates 452, and the connection lines from the light-emitting chips 451 to the substrates 452, and protect fragile devices such as the laser driver chips 310, the light-emitting chips 451, and the first converging lenses 453.

In some embodiments of the present disclosure, the top plate 4401 of the protective cover 440 may be a plastic plate or a metal plate, but generally needs to be prevented from being in contact with circuits of the circuit board 300. The top plate 4401 is made of a transparent plastic material, so that whether the connection lines and the easily-damaged devices under the protective cover 440 are damaged or not can be conveniently observed.

Figure 26:
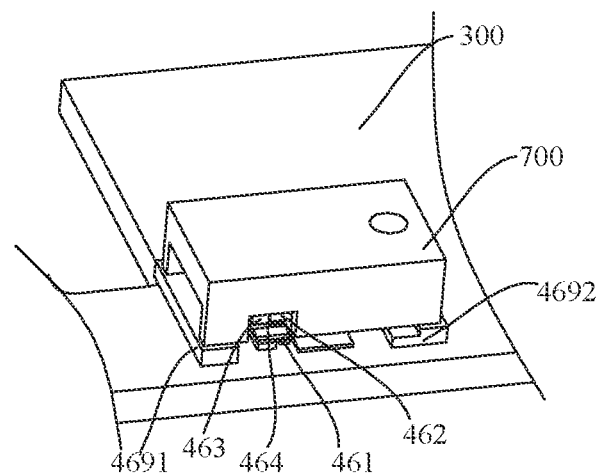
FIG. 26 is a partial assembly diagram of a light receiving assembly and a circuit board in an optical module, in accordance with some embodiments.

FIG. 26 is a partial assembly diagram of a light receiving assembly and a circuit board in an optical module in accordance with some embodiments. As shown in FIG. 26, an optical receiving case 700 covers the circuit board 300. The second converging lens array 463 and the reflection prism 462 are disposed inside the optical receiving case 700, an end of the optical receiving case 700 is connected to the first adjusting plate 4691, another end thereof is connected to the second adjusting plate 4692, and in turn, the optical receiving case 700 covers the reflection prism 462 over the light-receiving chip 461.

Figure 27:
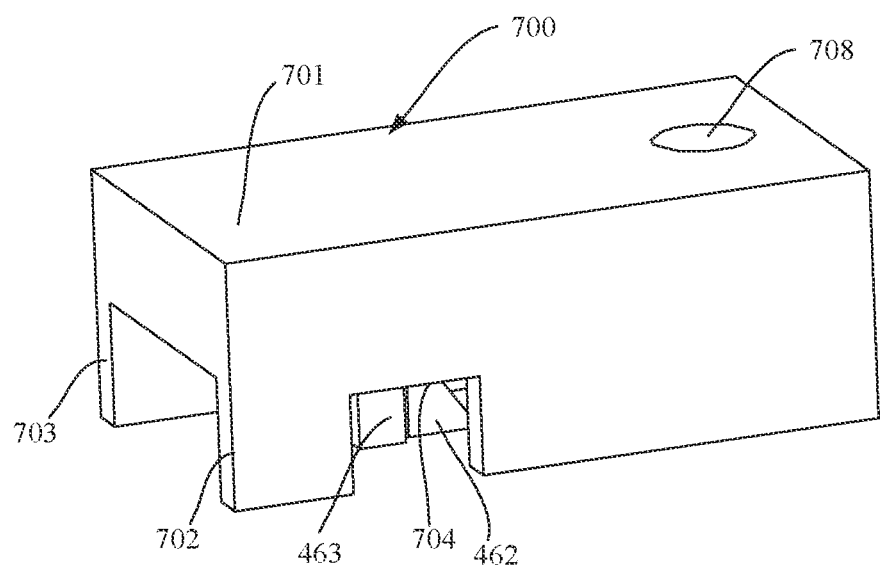
FIG. 27 is a structural diagram of an optical receiving case in an optical module, in accordance with some embodiments.
Figure 28:
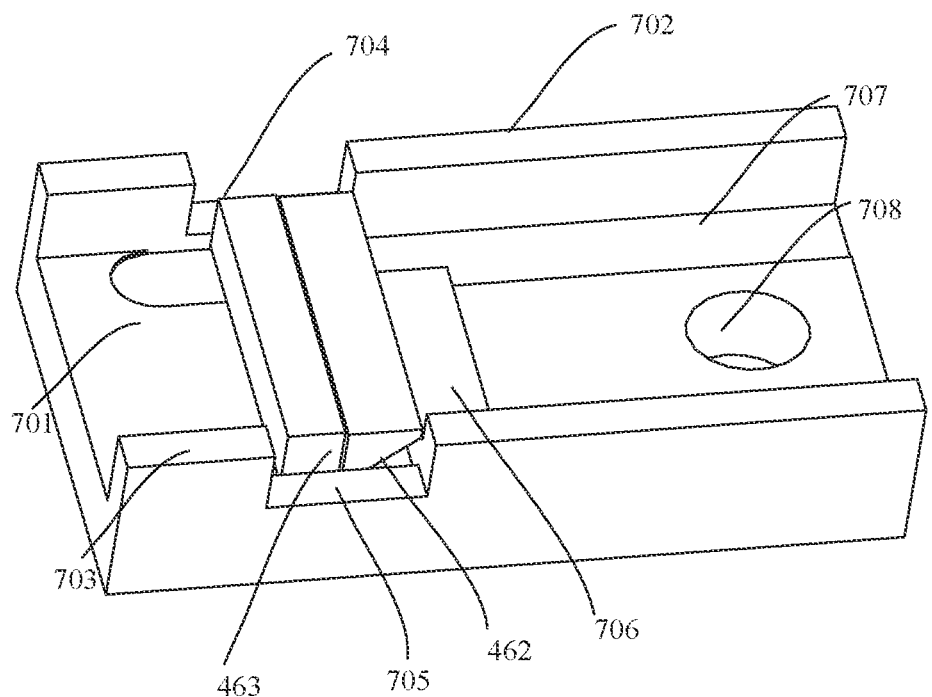
FIG. 28 is a structural diagram of an optical receiving case in an optical module from another angle, in accordance with some embodiments.
Figure 29:
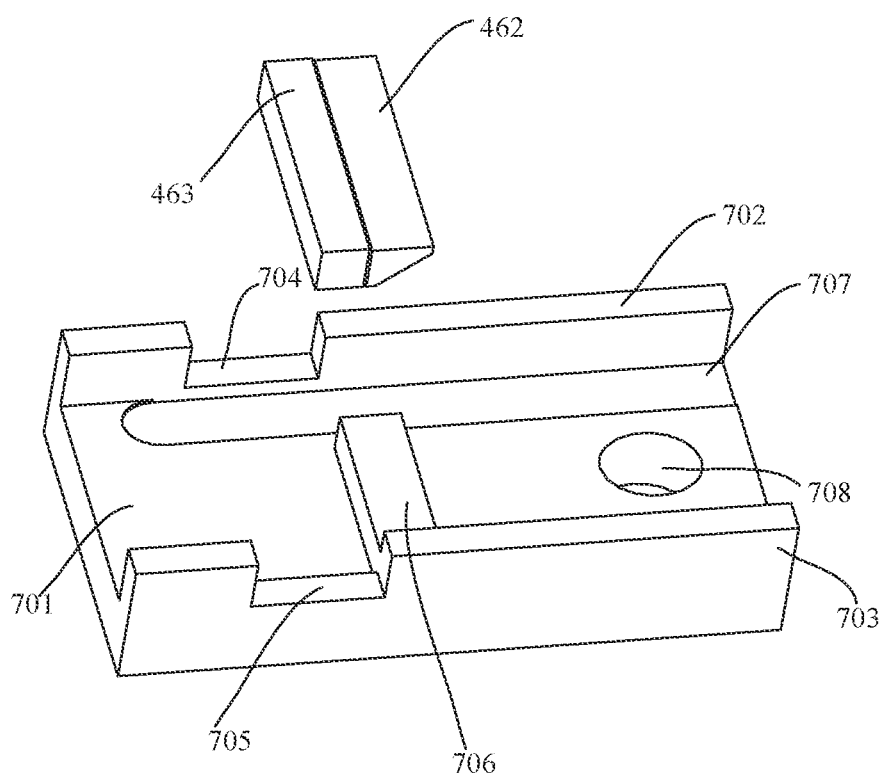
FIG. 29 is an exploded view of an optical receiving case, a second converging lens array and a reflection prism in an optical module, in accordance with some embodiments.

FIG. 27 is a structural diagram of an optical receiving case in an optical module in accordance with some embodiments, FIG. 28 is a structural diagram of an optical receiving case in an optical module from another angle in accordance with some embodiments, and FIG. 29 is an exploded view of an optical receiving case, a second converging lens array and a reflection prism in an optical module in accordance with some embodiments. As shown in FIGS. 27 to 29, the optical receiving case 700 provided by the embodiments of the present disclosure includes a third top plate 701, and a fifth upper side plate 702 and a sixth upper side plate 703 that are connected to the third top plate 701 and disposed oppositely. The third top plate 701 is configured to fixedly install the second converging lens array 463 and the reflection prism 462, and the fifth upper side plate 702 and the sixth upper side plate 703 are used to support the third top plate 701 such that the third top plate 701 covers devices such as the light-receiving chips 461. Meanwhile, the fifth upper side plate 702 and the sixth upper side plate 703 are also used to limit the second converging lens array 463 and the reflection prism 462, so that process of coupling and installation of the second converging lens array 463 and the reflection prism 462 is simplified. Generally, a distance between the fifth upper side plate 702 and the sixth upper side plate 703 is greater than a length of the second converging lens array 463 and a length of the reflection prism 462, which facilitates installation of the second converging lens array 463 and the reflection prism 462. In some embodiments of the present disclosure, end portions of the second converging lens array 463 and the reflection prism 462 abut against the fifth upper side plate 702 or the sixth upper side plate 703.

To facilitate the installation of the second converging lens array 463 and the reflection prism 462, the fifth upper side plate 702 has a first slot 704, the sixth upper side plate 703 has a second slot 705, and the first slot 704 and the second slot 705 are symmetrically disposed. The second converging lens array 463 and the reflection prism 462 enter and exit the optical receiving case 700 through the first slot 704 and the second slot 705. In some embodiments of the present disclosure, depths of the first slot 704 and the second slot 705 are less than heights of the fifth upper side plate 702 and the sixth upper side plate 703, so that in a case where the second converging lens array 463 and the reflection prism 462 are assembled to the optical receiving case 700, the end portions of the second converging lens array 463 and the reflection prism 462 abut against a region of the fifth upper side plate 702 or the sixth upper side plate 703 that is located at a bottom of the first slot 704 or the second slot 705.

To facilitate precise mounting of the second converging lens array 463 and the reflection prism 462 on the optical receiving case 700, the optical receiving case 700 further includes a positioning post 706 disposed on the third top plate 701, and the positioning post 706 may be used to position the second converging lens array 463 or the reflection prism 462, that is, the positioning post 706 is proximate to the second converging lens array 463 or the reflection prism 462. In an example in which the positioning post 706 positions the reflection prism 462, the positioning post 706 is disposed on a side of the reflection prism 462, and a surface of the reflection prism 462 proximate to the positioning post 706 is glued and connected to the positioning post 706. In this way, in a case where the reflection prism 462 is mounted on the optical receiving case 700, the reflection prism 462 is positioned by the fifth upper side plate 702 or the sixth upper side plate 703 in a width direction of the optical receiving case 700, and the reflection prism 462 is positioned by the positioning post 706 in a length direction of the optical receiving case 700, so as to achieve precise mounting of the reflection prism 462 on the optical receiving case 700. The second converging lens array 463 is mounted on a side of the reflection prism 462 away from the positioning post 706, so that the second converging lens array 463 can be precisely mounted on the optical receiving case 700, and in turn, precision and flatness of mounting positions of the second converging lens array 463 and the reflection prism 462 can be ensured.

In a case where there are arcs at a joint between the fifth upper side plate 702 and the third top plate 701 and at a joint between the sixth upper side plate 703 and the third top plate 701 due to poor right angle processing, mounting of the second converging lens array 463 and the reflection prism 462 may be interfered. In order to avoid appearance of arcs at the joint between the fifth upper side plate 702 and the third top plate 701 and at the joint between the sixth upper side plate 703 and the third top plate 701 due to the poor right angle processing, the joint between the fifth upper side plate 702 and the third top plate 701 and the joint between the sixth upper side plate 703 and the third top plate 701 may be provided with a sinking groove. For example, the optical receiving case 700 further includes a sinking groove 707, and the sinking groove 707 is disposed at the joint between the fifth upper side plate 702 and the third top plate 701. The sinking groove 707 may effectively prevent the arc from appearing at the joint between the fifth upper side plate 702 and the third top plate 701, and in turn, avoid interfering with the mounting of the second converging lens array 463 and the reflection prism 462, so that stability of a receiving optical path increases. In a case where ends of the second converging lens array 463 and the reflection prism 462 abut against the fifth upper side plate 702, the sinking groove 707 may be provided only at the joint between the fifth upper side plate 702 and the third top plate 701. Of course, the joint between the fifth upper side plate 702 and the third top plate 701 and the joint between the sixth upper side plate 703 and the third top plate 702 may each be provided with a sinking groove. The ends of the second converging lens array 463 and the reflection prism 462 may abut against the fifth upper side plate 702 or the sixth upper side plate 703 according to specific use requirements.

To facilitate installation of the optical receiving case 700, the third top plate 701 has an identification circular hole 708, and the identification circular hole 708 penetrates the third top plate 701. In a case where the optical receiving case 700 is fixed to the circuit board 300 by coupling, the optical receiving case 700 is positioned and identified through the identification circular hole 708.

The optical receiving case 700 may be made of a metallic material, which can facilitate the coupling and installation of the second converging lens array 463 and the reflection prism 462, reduce an influence of a transmitted optical signal on a received optical signal, and shield electromagnetic interference of the electrical devices in the light receiving assembly. In some embodiments of the present disclosure, the optical receiving case 700 is made of KOVAR® alloy, so that an expansion coefficient of the optical receiving case 700 is similar to expansion coefficients of the second converging lens array 463 and the reflection prism 462, and stability of the optical path during deformation processes of the optical receiving case 700 at high and low temperature is ensured.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. An optical module, comprising:
   a base, including:
      a first bottom plate having a first step surface, a second step surface, and a first connecting surface connected to the first step surface and the second step surface, and the first step surface being higher than the second step surface;
   a first cover covering the base;
   a circuit board, including:
      a first portion inserted into the base and located on the first step surface; and
      a second portion, a surface of the second portion proximate to the first portion abutting against the first connecting surface, and a width of the first portion being less than a width of the second portion;
   a light emitting assembly, including:
      a plurality of light-emitting chips disposed on the first bottom plate; and
      an optical multiplexer disposed on the first cover and located in a laser exit direction of the plurality of light-emitting chips; and
   a light receiving assembly, including:
      an optical demultiplexer disposed on the first cover; and
      a plurality of light-receiving chips disposed on the circuit board and located in a laser exit direction of the optical demultiplexer.

2. The optical module according to claim 1, wherein the circuit board further includes an electronic device, and the electronic device is disposed on a surface of the first portion proximate to the first bottom plate; and
   the first bottom plate is provided with an avoidance hole, and the avoidance hole corresponds to the electronic device.

3. The optical module according to claim 1, wherein the base further includes:
   a first lower side plate connected to the first bottom plate;
   a second lower side plate connected to the first bottom plate and disposed opposite to the first lower side plate; and
   a supporting stage disposed on the first step surface and configured to support the plurality of light-emitting chips;
   a surface of the supporting stage proximate to the first connecting surface is flush with the first connecting surface, and a surface of the supporting stage away from the first connecting surface is in contact with a surface of the first lower side plate proximate to the first connecting surface.

4. The optical module according to claim 3, wherein
   a surface of the first portion away from the second lower side plate is in contact with a surface of the supporting stage proximate to the second lower side plate, and a surface of the first portion proximate to the second lower side plate is in contact with the second lower side plate.

5. The optical module according to claim 4, wherein
   the first cover includes:
      a first top plate;
      a first upper side plate connected to the first top plate;
      a second upper side plate connected to the first top plate and the first upper side plate; and
      a partition plate disposed on a surface of the first top plate and partitioning the first cover into a first cavity and a second cavity; the optical multiplexer being located in the first cavity, the optical demultiplexer being located in the second cavity, and the second cavity being recessed relative to the first cavity; and
   the first upper side plate is connected to end surfaces of the first lower side plate and the second lower side plate, a surface of the first top plate away from the second upper side plate is connected to an inner wall of the first lower side plate, and an outer wall of the second upper side plate is connected to an inner wall of the second lower side plate.

6. The optical module according to claim 5, wherein
   the first cover includes:
      a first notch disposed on a side of the first top plate and located at a joint between the first top plate and the first upper side plate; and
      a second notch disposed on another side of the first top plate and located at a joint of the first top plate, the second upper side plate and the first upper side plate; and
   the base further includes:
      a first protrusion disposed on a surface of the first lower side plate facing the second lower side plate, located at an end portion of the first lower side plate, and embedded into the first notch; and
      a second protrusion disposed on a surface of the second lower side plate facing the first lower side plate, located at an end portion of the second lower side plate, and embedded into the second notch.

7. The optical module according to claim 5, wherein the first upper side plate has a first through hole and a second through hole; and
   the optical module further comprises a first fiber optic adapter and a second fiber optic adapter, the first fiber optic adapter is inserted into the first cavity through the first through hole, and the second fiber optic adapter is inserted into the second cavity through the second through hole.

8. The optical module according to claim 5, wherein
   the first cover further includes a first fixing protrusion disposed on the first top plate, a surface of the first fixing protrusion away from the first upper side plate is a flat surface, and a laser exit surface of the optical multiplexer is fixed on the surface of the first fixing protrusion away from the first upper side plate; and the optical module further comprises:
  a first shift prism disposed in the first cavity, a laser incident surface of the first shift prism being fixed on the laser exit surface of the optical multiplexer.

9. The optical module according to claim 8, wherein
the first cover further includes a second fixing protrusion disposed on the first top plate, and a surface of the second fixing protrusion proximate to the second upper side plate is a flat surface; and
the optical module further comprises:
  a second shift prism located in the second cavity, a surface of the second shift prism away from the second upper side plate being fixed on the surface of the second fixing protrusion proximate to the second upper side plate, and a laser exit surface of the second shift prism corresponding to a beam inlet of the optical demultiplexer.

10. The optical module according to claim 9, wherein the first portion of the circuit board is located between the optical demultiplexer, the second shift prism and the first bottom plate.

11. The optical module according to claim 5, further comprising a second cover;
the second cover includes a second top plate, and a third upper side plate and a fourth upper side plate that are connected to the second top plate and disposed oppositely; and
the base further includes a first boss and a second boss, the first boss is disposed on the supporting stage, the second boss is disposed on the second lower side plate; an inner wall of the third upper side plate is fixedly connected to the first boss, and an inner wall of the fourth upper side plate is fixedly connected to the second boss.

12. The optical module according to claim 11, further comprising:
  a protective cover disposed between the second cover and the circuit board and covering the plurality of light-emitting chips.

13. The optical module according to claim 12, wherein the protective cover includes:
  a top plate;
  a first support plate, an end of the first support plate being connected to the top plate, and another end thereof being connected to the circuit board; and
  a second support plate disposed opposite to the first support plate, an end of the second support plate being connected to the top plate, and another end thereof being connected to the circuit board.

14. The optical module according to claim 13, wherein the protective cover further includes a support pillar, the support pillar is disposed at a middle position of the top plate, an end of the support pillar is connected to the top plate, and another end thereof is connected to the circuit board.

15. The optical module according to claim 14, wherein the top plate includes a top plate notch;
  the top plate notch extends in a length direction of the top plate and a width direction of the top plate and is configured to avoid the plurality of light-receiving chips; and
  a size of the top plate notch in the length direction of the top plate is less than a length of the top plate, and a size of the top plate notch in the width direction of the top plate is less than a width of the top plate.

16. The optical module according to claim 11, further comprising:
  a reflection prism disposed on a side of the plurality of light-receiving chips away from the circuit board, and configured to reflect an optical signal from an outside of the optical module into the plurality of light-receiving chips; and
  an optical receiving case disposed between the second cover and the circuit board, and covering the plurality of light-receiving chips and the reflection prism, and the reflection prism being disposed on an inner wall of the optical receiving case.

17. The optical module according to claim 16, wherein
the optical receiving case includes a third top plate, and a fifth upper side plate and a sixth upper side plate that are connected to the third top plate and are disposed oppositely; and
the fifth upper side plate is provided with a first slot, the sixth upper side plate is provided with a second slot, and the reflection prism is fixed on the third top plate through the first slot and the second slot.

18. The optical module according to claim 17, wherein
a depth of the first slot is less than a height of the fifth upper side plate, and a depth of the second slot is less than a height of the sixth upper side plate.

19. The optical module according to claim 17, wherein the optical receiving case further includes a positioning post, the positioning post is disposed on the third top plate, and the reflection prism is connected to the positioning post.

20. The optical module according to claim 19, wherein the optical receiving case further includes a sinking groove, the sinking groove is disposed at a joint between the fifth upper side plate and the third top plate or at a joint between the sixth upper side plate and the third top plate.

* * * * *